(12) United States Patent
Neely et al.

(10) Patent No.: US 7,925,743 B2
(45) Date of Patent: Apr. 12, 2011

(54) METHOD AND SYSTEM FOR QUALIFYING USER ENGAGEMENT WITH A WEBSITE

(75) Inventors: Daniel Neely, Madison, WI (US); Glenn Jenkins, Madison, WI (US); Matthew Wulff, Brooklyn, WI (US); Michael Mitchell, Santa Cruz, CA (US)

(73) Assignee: Networked Insights, LLC, Madison, WI (US)

( * ) Notice: Subject to any disclaimer, the term of this patent is extended or adjusted under 35 U.S.C. 154(b) by 212 days.

(21) Appl. No.: 12/040,087

(22) Filed: Feb. 29, 2008

(65) Prior Publication Data
US 2009/0222551 A1    Sep. 3, 2009

(51) Int. Cl.
G06F 15/173    (2006.01)
G06F 15/16    (2006.01)

(52) U.S. Cl. .................. 709/224; 709/203; 707/3; 707/5
(58) Field of Classification Search .................. 709/203, 709/224; 707/3, 5
See application file for complete search history.

(56) References Cited

U.S. PATENT DOCUMENTS

| | | | |
|---|---|---|---|
| 5,794,177 A | 8/1998 | Carus et al. | |
| 5,799,268 A | 8/1998 | Boguraev | |
| 6,122,647 A | 9/2000 | Horowitz et al. | |
| 6,289,304 B1 | 9/2001 | Grefenstette | |
| 6,651,086 B1 | 11/2003 | Manber et al. | |
| 6,910,004 B2 | 6/2005 | Tarbouriech et al. | |
| 6,978,274 B1 | 12/2005 | Gullivan et al. | |
| 7,058,564 B2 | 6/2006 | Ejerhed | |
| 7,130,837 B2 | 10/2006 | Tsochantaridis et al. | |
| 7,194,406 B2 | 3/2007 | Ejerhed | |
| 7,639,672 B2 | 12/2009 | Foote | |
| 2003/0050977 A1 | 3/2003 | Puthenkulam et al. | |
| 2005/0171954 A1 | 8/2005 | Hull et al. | |
| 2005/0267766 A1 | 12/2005 | Galbreath et al. | |
| 2006/0064431 A1 | 3/2006 | Kishore et al. | |
| 2006/0080613 A1 | 4/2006 | Savant | |
| 2006/0271460 A1 | 11/2006 | Hanif | |
| 2006/0271959 A1 | 11/2006 | Jacoby et al. | |
| 2007/0067392 A1 | 3/2007 | Torres et al. | |
| 2007/0255754 A1* | 11/2007 | Gheel | 707/104.1 |
| 2007/0282621 A1 | 12/2007 | Altman et al. | |
| 2008/0040142 A1 | 2/2008 | Liu | |

(Continued)

FOREIGN PATENT DOCUMENTS

CA    002400123    9/2001

(Continued)

OTHER PUBLICATIONS

International Search Report dated May 27, 2008 for PCT/US2007/084258.

(Continued)

*Primary Examiner* — Jeong S Park
(74) *Attorney, Agent, or Firm* — Foley & Lardner LLP

(57) ABSTRACT

A system and a method of identifying information characterizing use of a website is provided. A plurality of user profiles are analyzed. A user profile includes information associated with an interaction by a user with the website. A plurality of user comments associated with the website are analyzed. Characteristic information associated with use of the website is determined based on the analyzed user profiles and the analyzed user comments. The determined characteristic information is presented to a user.

23 Claims, 28 Drawing Sheets

U.S. PATENT DOCUMENTS

| | | | |
|---|---|---|---|
| 2008/0086431 | A1 | 4/2008 | Robinson et al. |
| 2008/0098087 | A1 | 4/2008 | Lubeck |
| 2008/0098313 | A1 | 4/2008 | Pollack |
| 2008/0104227 | A1 | 5/2008 | Birnie et al. |
| 2008/0154883 | A1* | 6/2008 | Chowdhury et al. ............. 707/5 |
| 2008/0288481 | A1* | 11/2008 | Zeng et al. ......................... 707/5 |
| 2009/0037421 | A1* | 2/2009 | Gamble ........................... 707/10 |

FOREIGN PATENT DOCUMENTS

| | | |
|---|---|---|
| KR | 2001/0097681 | 11/2001 |
| WO | WO 02/101483 | 12/2002 |

OTHER PUBLICATIONS

JWI 2.1.1 (MIT Java Wordnet Interface) website http://www.mit.edu/~markaf/projects/wordnet/ printed Mar. 12, 2008.

MontyLingua :: a free, commonsense-enriched natural language understander, "MontyLingua V.2.1 )Python and Java)" website http://web.media.mit.edu/~hugo/montylingua/ printed Mar. 12, 2008.

WordNet—Princeton University Cognitive Science Laboratory, "About WordNet" website http://wordnet.princeton.edu/, printed Mar. 12, 2008.

Kamps et al., "Using WordNet to Measure Semantic Orientations of Adjectives," in Proceedings of the Fourth International Conference on Language Resources and Evaluation, (vol. IV, pp. 1115-1118), May 24, 2004.

Esuli et al., "Determining the Semantic Orientation of Terms through Gloss Classification." In Proceedings of CIKM-05, 14$^{th}$ ADM International Conference on Information and Knowledge Management, pp. 617-624, Bremen, DE, Oct. 31, 2005.

US Office Action for U.S. Appl. No. 11/937,682, dated Apr. 27, 2010.

* cited by examiner

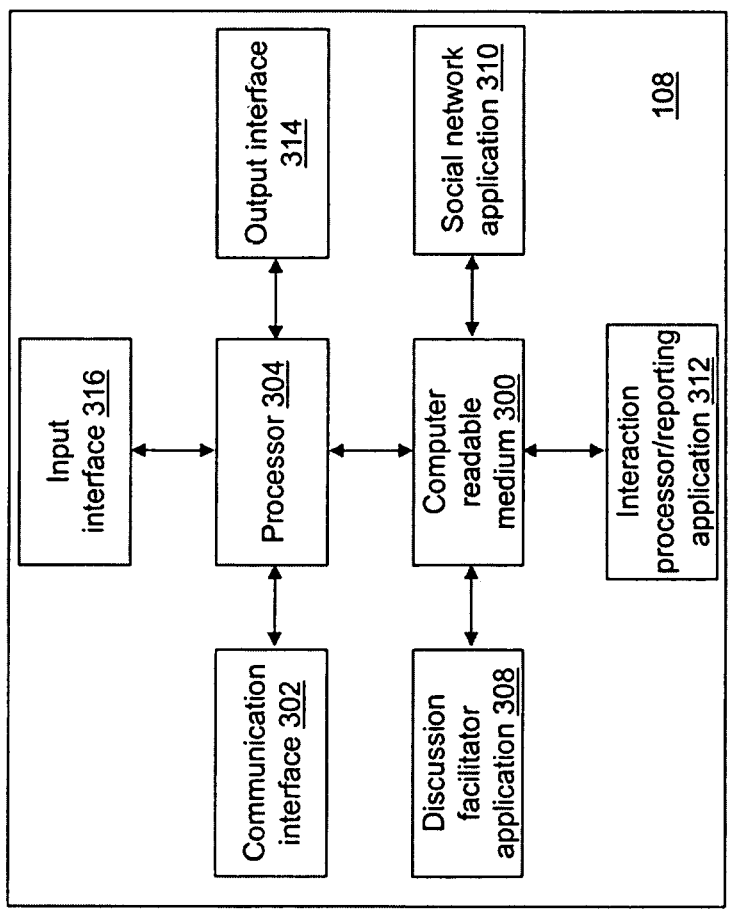
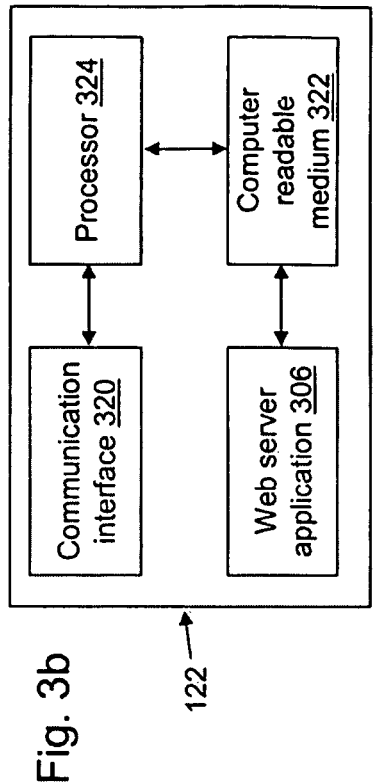

ABOUT ME / WHY I'M HERE ⟵ 1322

WHY I'M HERE

39 AVAILABLE POINTS ⟵ 1402

CLICK AS MANY AS APPLY
☐ FRIENDS     ☐ ADVICE FROM OTHERS    ☐ READ ONLY
☐ NETWORKING  ☐ GIVING ADVICE         ☐ NONE OF THE ABOVE

THINGS I WANT TO LEARN
1  NOTHING ENTERED YET
2  NOTHING ENTERED YET
3  NOTHING ENTERED YET

THINGS I WANT TO SHARE
1  NOTHING ENTERED YET
2  NOTHING ENTERED YET
3  NOTHING ENTERED YET

THINGS I NEED HELP WITH
1  NOTHING ENTERED YET
2  NOTHING ENTERED YET
3  NOTHING ENTERED YET

SHARED WITH: -SELECT-

1400

(EDIT) ⟵ 1404

TOP CUSTOMER NEEDS & ISSUES — 2000

🔍 INSIGHT: YOUR CUSTOMER NEEDS HELP WITH SELLING

INSIGHT DETAILS — 2002 — 2006

DISCUSSIONS RELATED TO INSIGHT — 2008

[STATISTICS] [FILTER SETTINGS] — 2010

SORT [INTERACTION LEVEL ▷] — 2014

CLOSE ☒ — 2004

INTERACTION LEVEL — 989

☐ HOW TO MAKE MONEY FROM ART? — 2016
927  ★★★★☆ ASK THE ARTIST COMMUNITY / ARTIST QUESTIONS
8 POSTS  7 CONTRIBUTORS    LAST POST DATE: 10-18-2007 11:25:34 AM

COMMUNITY RATING — 2016
★★★★☆

SENTIMENT
▭

☐ ARTISTS SELLING THROUGH THE ARTFUL HOME — 2016
34  ★★★★★ ASK THE ARTIST COMMUNITY / GENERAL QUESTIONS
1 POST  1 CONTRIBUTOR    LAST POST DATE: 10-21-2007 10:24:12 PM

POSTS  10

CONTRIBUTORS  8

DISCUSSIONS  3 — 2018

☐ MUMMY'S BUNDLE NECKLACES — 2016
28  ★★★★★ ASK THE ARTIST COMMUNITY / GENERAL QUESTIONS
1 POST  1 CONTRIBUTOR    LAST POST DATE: 10-16-2077 02:56:39 PM

AGE
13-17  ▭ 0%
18-24  ▭ 0%
25-34  ▭ 0%
35-44  ▬▬ 50%

GENDER
◯
100% MALE    0% FEMALE

FIG. 20a

| INSIGHT DETAILS | DISCUSSIONS RELATED TO INSIGHT |
|---|---|
| STATISTICS \| FILTER SETTINGS — 2014 | SORT (INTERACTION LEVEL ▽) — 2016 |
| THESE FILTER SETTINGS WERE USED TO CREATE THIS INSIGHT | ☐ HOW TO MAKE MONEY FROM ART? <br> 927 ★★★★★ ASK THE ARTIST COMMUNITY / ARTIST QUESTIONS <br> 8 POSTS 7 CONTRIBUTORS   LAST POST DATE: 10-18-2007 11:25:34 AM |
| INSIGHT TYPE <br> TOP CUSTOMER NEEDS & ISSUES | ☐ ARTISTS SELLING THROUGH THE ARTFUL HOME <br> 34 ★★★★★ ASK THE ARTIST COMMUNITY / GENERAL QUESTIONS <br> 1 POST 1 CONTRIBUTOR   LAST POST DATE: 10-21-2007 10:24:12 PM |
| INSIGHT VIEW <br> DEFAULT | |
| KEYWORDS <br> NO KEYWORDS SET | ☐ MUMMY'S BUNDLE NECKLACES — 2016 <br> 28 ★★★★★ ASK THE ARTIST COMMUNITY / GENERAL QUESTIONS <br> 1 POST 1 CONTRIBUTOR   LAST POST DATE: 10-16-2077 02:56:39 PM |
| ACTIVITY PERIOD <br> ALL | |
| CATEGORY <br> ALL CATEGORIES | |
| AVERAGE RATING <br> ALL | |
| DEMOGRAPHICS <br> AGE RANGE <br> ALL | |
| GENDER <br> BOTH | |
| LOCATION <br> ALL REGIONS <br> ALL STATES | |

FIG. 20b

| TOP CUSTOMER NEEDS & ISSUES | | CLOSE ☒ |
|---|---|---|
| — MARY LYNN O'SHEA'S SHELBOURNE CHAIR | | |

INSIGHT DETAILS 2206

| STATISTICS | FILTER SETTINGS | DISCUSSIONS POSTS | | |
|---|---|---|---|---|
| INTERACTION LEVEL | 47 | SORT (NEW TO OLD ▽) 2214 | | KEYWORD HIGHLIGHT ⊕ |
| COMMUNITY RATING ☆☆☆☆ | | ? AGE? | A CUP OF COFFEE, COLORED WITH CREAM, A DEEP — 2216 AND SATISFYING BOOK, AND A COZY CHAIR IN WHICH TO READ CREATE THE PERFECT AFTERNOON DELIGHT IN MY MIND. AS... | |
| SENTIMENT ▭ | | | | |
| POSTS | 1 | POST RATING ☆☆☆☆☆ POSTED BY CIN_MEMBER2 09-26-2007 04:27:30 PM | | |
| CONTRIBUTORS | 1 | | | |
| AGE | | | | |
| 13-17 ▫ 0% | | | | |
| 18-24 ▫ 0% | | | | |
| 25-34 ▫ 0% | | | | |
| 35-44 ▪ 0% | | | | |
| GENDER | | | | |
| 0% MALE 0% FEMALE | | | | |
| 0 TOTAL | | | | |

FIG. 22

METHOD AND SYSTEM FOR QUALIFYING USER ENGAGEMENT WITH A WEBSITE

FIELD

This application relates to U.S. patent application Ser. No. 11/937,682, entitled "METHOD AND SYSTEM FOR AUTOMATICALLY IDENTIFYING USERS TO PARTICIPATE IN AN ELECTRONIC CONVERSATION," and having inventors Daniel Neely, Glenn Jenkins, Michael Mitchell, Matthew Wulff and Rhonda Saylor. U.S. patent application Ser. No. 11/937,682, claims the benefit under 35 U.S.C. §119 (e) of U.S. Provisional Patent Application Ser. No. 60/865,721 that was filed Nov. 14, 2006.

BACKGROUND

Traditionally, businesses and other organizations have used focus groups, surveys, and feedback forms to gather customer data. These methods are largely one-to-one communications and biased toward the businesses, thus limiting the precision, accuracy, and depth of the insights gathered. Moreover, these methods generally produce customer data that is outdated which inhibits a business' ability to be responsive to customer's needs. However, customers are increasingly willing to join specialized social networks that speak directly to an interest or issue area of the customer. A social network associated with a business or organization provides customers with a platform to discuss issues with their peers and through which their voice can be heard.

Social networks include a variety of members who join to meet people, to discuss common issues, to locate information, etc. A social networking platform may include social networking features such as identity, presence, relationships, profiles, groups, discussions, and sharing. In general, a member of a social network has a profile that identifies characteristics of the member for other members of the network and for the social networking platform. The social network can facilitate interaction between members based on associations or relationships identified from the member profiles. A social network may include a plurality of sub-networks and groups that further characterize members. For example, a social network may be associated with a health care organization, a sub-network of the social network may be associated with cancer, and a group of the sub-network may be associated with lung cancer. Social networks may be accessed through a portal or a general website using a variety of computing devices including a phone, a personal digital assistant, a computer of any form factor, etc.

In the commercial sector, on-line merchants have created groups of customers who share common interests in the goods and services offered by the on-line merchant. Some merchants include systems that provide suggestions to their customers based on determined needs of the customer. In such commercial, social networks, customers interact with the merchant, but generally do not interact directly with each other. Additionally, current customer and business intelligence solutions provide information on what the customer is buying based on the interactions with the merchant. This purchasing data, however, only represents a purchase decision at a point in time and does not indicate why the customer selected a product for purchase; what resources were used to inform the buying decision; what the customer's objectives were in making the purchase; what will cause the customer to repeat their transaction; or what will cause other customers to purchase the product. Thus, what is needed is a system and a method that provides a customer interaction network platform that enables businesses to capture and analyze the collective intelligence of their customers through a customer-to-customer social network.

SUMMARY

An exemplary method of identifying information characterizing use of a website is provided. A plurality of user profiles are analyzed. A user profile includes information associated with an interaction by a user with the website. A, plurality of user comments associated with the website are analyzed. Characteristic information associated with use of the website is determined based on the analyzed user profiles and the analyzed user comments. The determined characteristic information is presented to a user.

In another exemplary embodiment, a computer-readable medium is provided comprising computer-readable instructions that, upon execution by a processor, cause the processor to perform the operations of the method of identifying information characterizing use of a website.

In yet another exemplary embodiment, a device is provided. The device includes, but is not limited to, a processor and a computer-readable medium. The computer-readable medium operably couples to the processor. The computer-readable medium comprises instructions that, upon execution by the processor, perform the operations of the method of identifying information characterizing use of a website.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

FIG. 3a is a block diagram of a second device in communication with the first device to support the electronic discussion at the first device of FIG. 2 in accordance with an exemplary embodiment.

FIG. 3b is a block diagram of a third device in communication with the first device and/or the second device to support the electronic discussion at the first device of FIG. 2 in accordance with an exemplary embodiment.

FIG. 7 depicts a user interface of a social network application in accordance with an exemplary embodiment.

FIG. 14 depicts a second user profile user interface of the social network application in accordance with the second exemplary embodiment.

FIG. 20a depicts a second user interface of the interaction processing and reporting application in accordance with the second exemplary embodiment, wherein the second user interface is, generated after selection of a first item from the user interface of FIG. 19a.

FIG. 20b depicts a third user interface of the interaction processing and reporting application in accordance with the second exemplary embodiment, wherein the third user interface is generated after selection of an item from the user interface of FIG. 20a.

FIG. 21 depicts a fourth user interface of the interaction processing and reporting application in accordance with the second exemplary embodiment, wherein the fourth user interface is generated after selection of a second item from the user interface of FIG. 19a.

FIG. 22 depicts a fifth user interface of the interaction processing and reporting application in accordance with the second exemplary embodiment, wherein the fifth user interface is generated after selection of a third item from the user interface of FIG. 19a.

FIG. 23 depicts a sixth user interface of the interaction processing and reporting application in accordance with the second exemplary embodiment, wherein the sixth user interface is generated after selection of a fourth item from the user interface of FIG. 19a.

DETAILED DESCRIPTION

Figure 1:
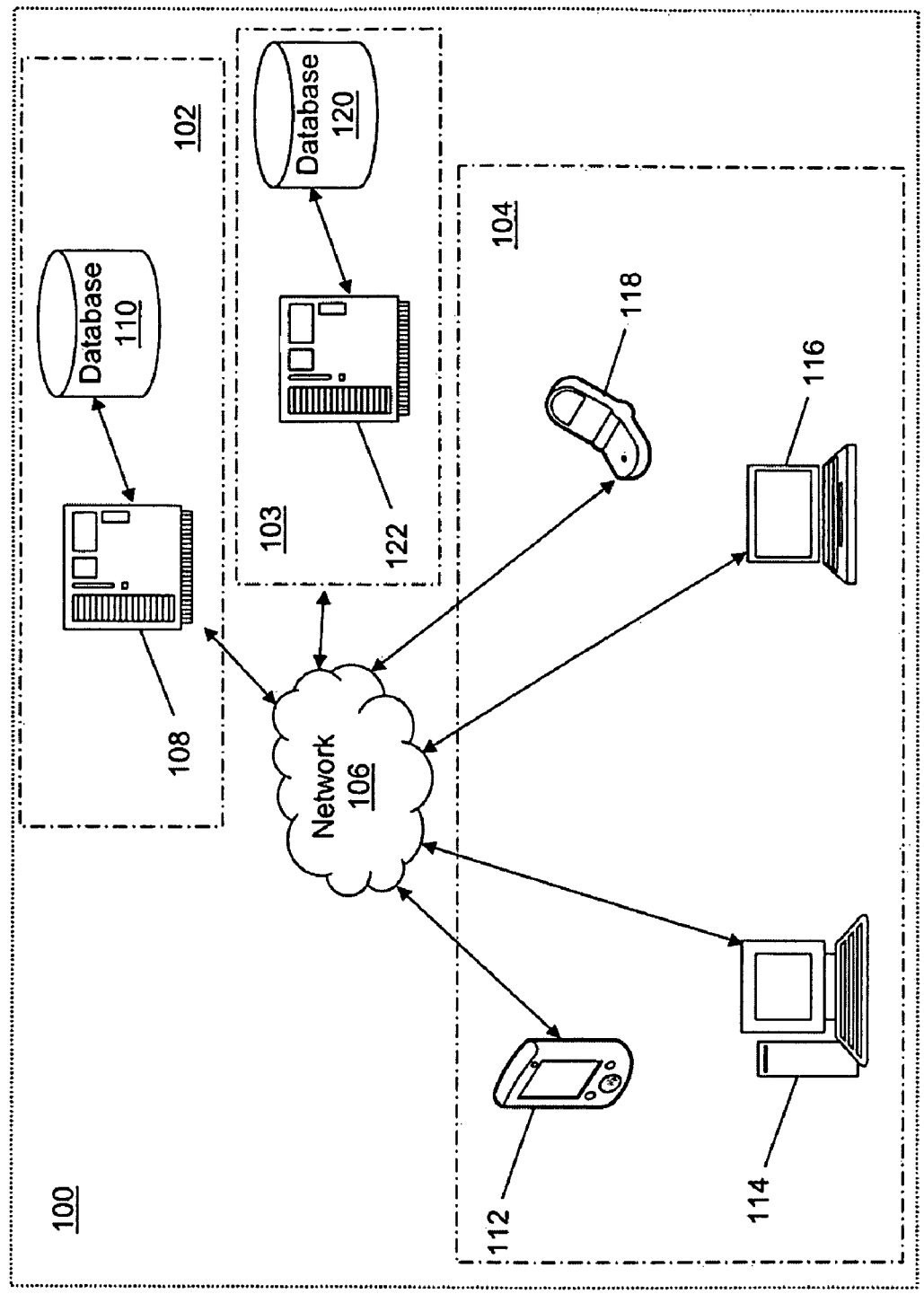
FIG. 1 depicts a system that includes devices supporting an electronic discussion in accordance with an exemplary embodiment.

With reference to FIG. 1, a system diagram of an electronic discussion system 100 is shown in accordance with an exemplary embodiment. Electronic discussion system 100 may include a server system 102, a second server system 103, a plurality of user devices 104, and a network 106. There may be fewer or additional networks in electronic discussion system 100. For example, network 106 may include one or more local area network, one or more wide area network, one or more cellular network, etc. In an exemplary embodiment network 106 includes the Internet.

Server system 102 may include a server 108 and a database 110. Server system 102 may include a plurality of servers. Server 108 includes or can access database 110 either through a direct connection or through a second network. The second network may include or otherwise use network 106. Database 110 may include a plurality of databases that may be organized into multiple database tiers to improve data management and access. Database 110 is a data repository for electronic discussion system 100. Database 110 may utilize various database technologies and a variety of different formats as known to those skilled in the art including a simple file system, a relational database, a system of tables, etc. alone or in combination.

Server system 103 may include a server 122 and a database 120. Server system 103 may include a plurality of servers. Server 122 includes or can access database 120 either through a direct connection or through a second network. The second network may include or otherwise use network 106. Database 120 may include a plurality of databases that may be organized into multiple database tiers to improver data management and access. Database 120 is a data repository for an on-line merchant which may include user profile data associated with a social network application. Database 110 may utilize various database technologies and a variety of different formats as known to those skilled in the art including a simple file system, a relational database, a system of tables, etc. alone or in combination. Server 122 includes or can access database 120 either through a direct connection, a second network, and/or through network 106. Database 120 may include a plurality of databases that may be organized into multiple database tiers to improve data management and access. Database 120 is a data repository for an on-line merchant which may include user profile data associated with a social network application. Database 120 may utilize various database technologies and a variety of different formats as known to those skilled in the art including a simple file system, a relational database, a system of tables, etc. alone or in combination.

In electronic discussion system 100, the plurality of user devices 104 send and receive signals through network 106 to/from server 108, to/from server 122, and/or to/from other user devices. Electronic discussion system 100 can include any number and type of user devices that may be organized into subnets. The plurality of client devices 104 may include a first user device 112, a second user device 114, a third user device 116, and a fourth user device 118. The plurality of user devices 104 may include computing devices of any form factor such as a laptop, a desktop, an integrated messaging device, a personal digital assistant, a cellular telephone, an IPod, etc. Electronic discussion system 100 may include additional types of devices. The plurality of user devices 104 communicate using various transmission media that may be wired or wireless.

Figure 2:
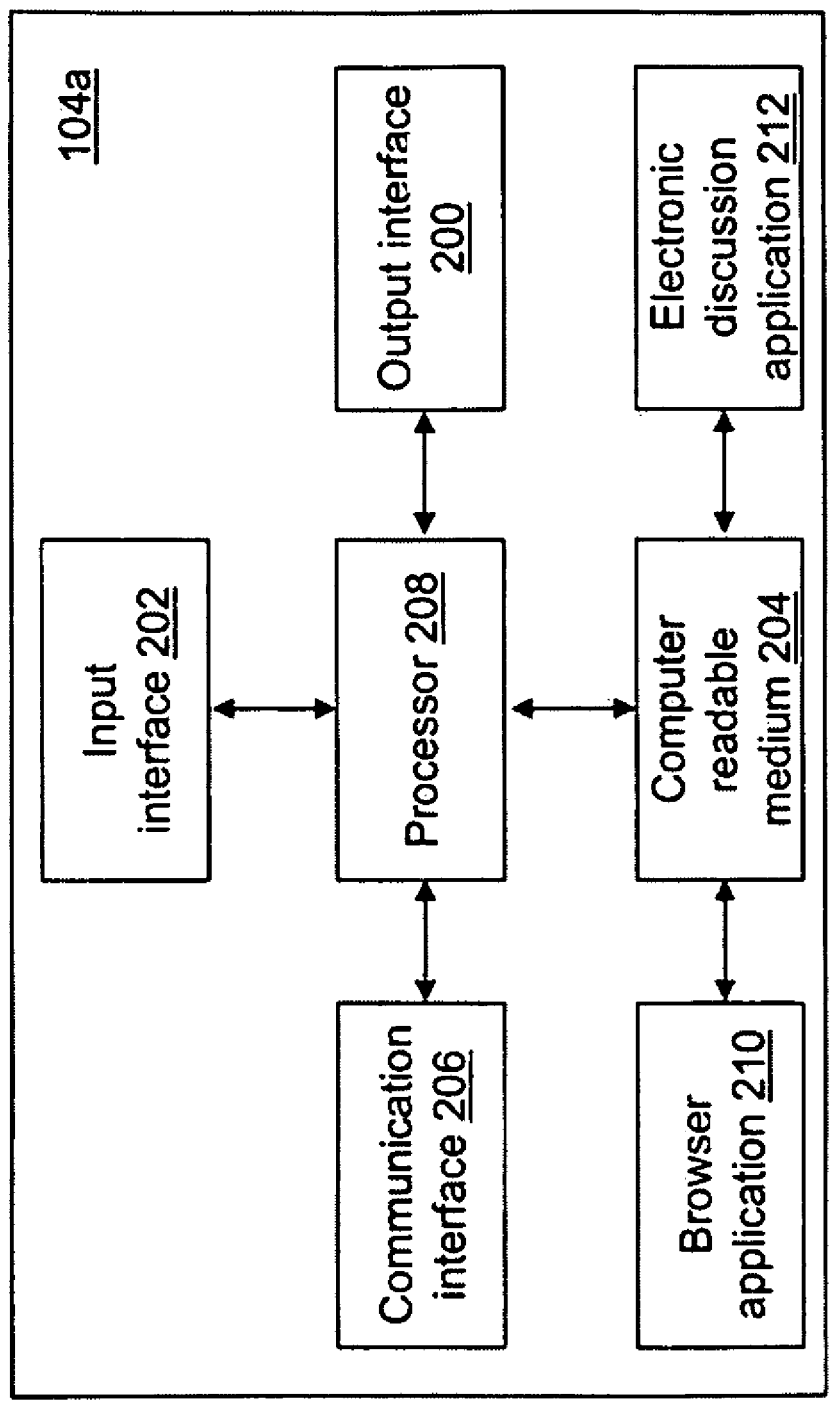
FIG. 2 is a block diagram of a first device supporting the electronic discussion in accordance with an exemplary embodiment.

With reference to FIG. 2, a user device 104a is shown in an exemplary embodiment. User device 104a may include a output interface 200, an input interface 202, a computer-readable medium 204, a communication interface 206, a processor 208, a browser application 210, and an electronic discussion application 212. Different and additional components may be incorporated into user device 104a.

Output interface 200 captures and/or presents information to a user of computing device 104a as known to those skilled in the art. For example, output interface 200 may be a display or a printer. Exemplary displays include thin film transistor displays, light emitting diode displays, and liquid crystal displays. Exemplary printers include laser printers, inkjet printers, dot matrix printers, plotters, and thermal printers. User device 104a may include one or more output interfaces that use the same or different output technologies.

Input interface 202 provides an interface for receiving information from the user for entry into user device 104a as known to those skilled in the art. Input interface 202 may use various input technologies including, but not limited to, a keyboard, a pen and touch screen, a mouse, a track ball, a touch screen, a keypad, one or more buttons, voice-to-text recognition system, etc. to allow the user to enter information into user device 104a or to make selections presented in a user interface displayed on output interface 200. Input interface 202 may provide both an input and an output interface. For example, a touch screen both allows user input and presents output to the user. User device 104a may include one or more input interfaces that use the same or different input technologies.

Computer-readable medium 204 is an electronic holding place for information so that the information can be accessed by processor 208 as known to those skilled in the art. User device 104a may have one or more computer-readable media that use the same or a different computer-readable medium technology. Computer-readable medium technologies include, but are not limited to, any type of random access computer-readable, medium (RAM), any type of read only computer-readable medium (ROM), any type of flash computer-readable medium, etc. User device 104a also may have one or more drives that support the loading of a computer-readable medium such as a compact disc (CD) or digital versatile disc (DVD) or ports that support connectivity with computer-readable media such as flash drives.

Communication interface 206 provides an interface for receiving and transmitting messages, files, and any other information communicable between devices using various protocols, transmission technologies, and media as known to those skilled in the art. Communication, interface 206 may support communication using various transmission media that may be wired or wireless. User device 104a may have one or more communication interfaces that use the same or different protocols, transmission technologies, and media.

Processor 208 executes instructions as known to those skilled in the art. The instructions may be carried out by a special purpose computer, logic circuits, or hardware circuits. Thus, processor 208 may be implemented in hardware, firmware, software, or any combination of these methods. The term "execution" is the process of running an application or the carrying out of the operation called for by an instruction. The instructions may be written using one or more programming language, scripting language, assembly language, etc. Processor 208 executes an instruction, meaning that it performs the operations called for by that instruction. Processor 208 operably couples with output interface 200, with input interface 202, with computer-readable medium 204, and with communication interface 206 to receive, to send, and to process information. Processor 208 may retrieve a set of instructions from a permanent computer-readable medium device and copy the instructions in an executable form to a temporary computer-readable medium device that is generally some form of RAM. User device 104a may include a plurality of processors that use the same or a different processing technology.

A user may execute browser application 210 installed at user device 104a to access a web server application 306, for example, hosted at server 122 depicted in FIG. 3b. For example, the user may enter a uniform resource locator (URL) into browser application 210 where the URL is associated with a resource supported by web server application 306. Through interaction with web server application 306, the user may download and install electronic discussion application 212 at user device 104a. In another exemplary embodiment, electronic discussion application 212 may be embedded within browser application 210 using an interactive web technology such as asynchronous JavaScript™ and the extensible mark-up language (XML).

Electronic discussion application 212 performs operations associated with electronic discussion processes. The operations may be implemented using hardware, firmware, software, or any combination of these methods. With reference to the exemplary embodiment of FIG. 2, electronic discussion application 212 is implemented in software stored in computer-readable medium 204 and accessible by processor 208 for execution of the instructions that embody the operations of electronic discussion application 212. Electronic discussion application 212 may be written using one or more programming languages, assembly languages, scripting languages, etc. Electronic discussion application 212 may include capabilities associated with a variety of text messaging applications, including, but not limited to an instant messaging application, a chat session application, an e-mail application, a short messaging service application, a multimedia messaging service application, etc. In an exemplary embodiment, the operations of electronic discussion application 212 are embodied in browser application 210. Electronic discussion application 212 may further provide voice to text and/or text to voice capabilities.

With reference to FIG. 3a, components of server 108 are shown in an exemplary embodiment. Server 108 may include a computer-readable medium 300, a communication interface 302, a processor 304, a discussion facilitator application 308, a social network application 310, an interaction processing/reporting application 312, an output interface 314, and an input interface 316. Different and additional components may be incorporated into server 108. For example, analysis plug-in connections to interaction processing/reporting application 312 and/or to a company's enterprise data analysis/visualization applications may be provided by server 108.

Output interface 314 presents information to a user of server 108. For example, output interface 314 may be a display or a printer. Server 108 may include one or more output interfaces that use the same or different output technologies.

Input interface 316 provides an interface for receiving information from the user for entry into server 108 as known to those skilled in the art. Input interface 316 may use various input technologies including, but not limited to, a keyboard, a pen and touch screen, a mouse, a track ball, a touch screen, a keypad, one or more buttons, voice-to-text recognition system, etc. to allow the user to enter information into server 316 or to make selections presented in, a user interface displayed on output interface 314. Input interface 316 may provide both an input and an output interface. For example, a touch screen both, allows user input and presents output to the user. Server 108 may include one or more input interfaces that use the same or different input technologies.

Computer-readable medium 300 is an electronic holding place for information so that the information can be accessed by processor 304 as known to those skilled in the art. Server 108 may have one or more computer-readable media that use the same or a different computer-readable medium technology. Computer-readable medium technologies include, but are not limited to, any type of RAM, any type of ROM, any type of flash computer-readable medium, any type of long term computer-readable medium storage, etc. Server 108 also may have one or more drives that support the loading of a computer-readable medium such as a CD or DVD or ports that support connectivity with computer-readable media such as flash drives.

Communication interface 302 provides an interface for receiving and transmitting messages, files, and any other information communicable between devices using various protocols, transmission technologies, and media as known to those skilled in the art. Communication interface 302 may support communication using various transmission media, that may be wired or wireless. Server 108 may have one or more communication interfaces that use the same or different protocols, transmission technologies, and media.

Processor 304 executes instructions as known to those skilled in the art. The instructions may be carried out by a special purpose computer, logic circuits, or hardware circuits. Thus, processor 304 may be implemented in hardware, firmware, software, or any combination of these methods. The instructions may be written using one or more programming language, scripting language, assembly language, etc. Processor 304 executes an instruction, meaning that it performs the operations called for by that instruction. Processor 304 operably couples with output interface 314, with input interface 316, with computer-readable medium 300, and with communication interface 302 to receive, to send, and to process information. Processor 304 may retrieve a set of instructions from a permanent computer-readable medium device and copy the instructions in an executable form to a temporary computer-readable medium device that is generally some form of RAM. Server 108 may include a plurality of processors that use the same or a different processing technology.

Discussion facilitator application 308 performs operations associated with automatically identifying users to participate in an electronic discussion over a network and with implementing an agent. The identified users may be anonymous to each other. The operations may be implemented using hardware, firmware, software, or any combination of these methods. With reference to the exemplary embodiment of FIG. 3a, discussion facilitator application 308 is implemented in software stored in computer-readable medium 300 and accessible by processor 304 for execution of the instructions that embody the operations of discussion facilitator application 308. Discussion facilitator application, 308 may be written using one or more programming languages, assembly languages, scripting languages, etc.

Social network application 310 performs operations associated with a social network. The operations may be implemented, using hardware, firmware, software, or any combination of these methods. With reference to the exemplary embodiment of FIG. 3a, social network application 310 is, implemented in software stored in computer-readable medium 300 and accessible by processor 304 for execution of the instructions that embody the operations of social network application 310. Social network, application 310 may be written using one or more programming languages, assembly languages, scripting languages, etc.

Interaction processing/reporting application 312 performs operations associated with analyzing the discussions between the members of the social network. The operations may be implemented using hardware, firmware, software, or any combination of these methods. With reference to the exemplary embodiment of FIG. 3a, interaction processing/reporting application 312 is implemented in software stored in computer-readable medium 300 and accessible by processor 304 for execution of the instructions that embody the operations of interaction processing/reporting application 312. Interaction processing/reporting application 312 may be written using one or more programming languages, assembly languages, scripting languages, etc.

With reference to FIG. 3b, components of second server 122 are shown in an exemplary embodiment. Server 122 may include a computer-readable medium 322, a communication interface 320, a processor 324, and web server application 306. Computer-readable medium 322 is an electronic holding place for information so that the information can be accessed by processor 324 as known to those skilled in the art. Server 122 may have one or more computer-readable media that use the same or a different computer-readable medium technology. Computer-readable medium technologies include, but are not limited to, any type of RAM, any type of ROM, any type of flash computer-readable medium, any type of long term computer-readable medium storage, etc. Server 122 also may have one or more drives that support the loading of a computer-readable medium such as a CD or DVD or ports that support connectivity with computer-readable media such as flash drives.

Communication interface 320 provides an interface for receiving and transmitting messages, files, and any other information communicable between devices using various protocols, transmission technologies, and media as known to those skilled in the art. Communication interface 320, may support communication using various transmission media that may be wired or wireless. Server 122 may have one or more communication interfaces that use the same or different protocols, transmission technologies, and media.

Processor 324 executes instructions as known to those skilled in the art. The instructions may be carried out by a special purpose computer, logic circuits, or hardware circuits. Thus, processor 324 may be implemented in hardware, firmware, software, or any combination of these methods. The instructions may be Written using one or more programming language, scripting language, assembly language, etc. Processor 324 executes an instruction, meaning that it performs the operations called for by that instruction. Processor 324 operably couples with computer-readable medium 322 and with communication interface 320 to receive, to send, and to process information. Processor 324 may retrieve a set of instructions from a permanent computer-readable medium device and copy the instructions in an executable form to a temporary computer-readable medium device that is generally some form of RAM. Server 122 may include a plurality of processors that use the same or a different processing technology.

Web server application 306 performs operations associated with controlling the display of multiple web pages that present information to the user and from which the user may make selections. The operations may be implemented using hardware, firmware, software, or any combination of these methods. With reference to the exemplary embodiment of FIG. 3b, web server application 306 is implemented in software stored in computer-readable medium 322 and accessible by processor 324 for execution of the instructions that embody the operations of web server application 306. Web server application 306, may be written using one or more programming languages, assembly languages, scripting languages, etc.

A website is a collection of web pages, images, videos or other digital assets that is hosted on one or more web servers such as server 122. A web page is a document that may be written in the hypertext markup language (HTML) and is generally accessible via hypertext transfer protocol (HTTP). HTTP controls the transfer of information from the web server such as server 122 to output interface 200 using browser application 210. All publicly accessible websites may be seen collectively as constituting the "World Wide Web". A web page may contain links to other web pages with related or additional information. Each web page is identified by a URL that includes the location or address of the computer that contains the resource to be accessed in addition to the location of the resource on that computer. The type of file or resource depends on the Internet application protocol. For example, HTTP may describe a web page to be presented using browser application 210.

Server 108 may be integrated with server 122. In an exemplary embodiment, the operations of one or more of discussion facilitator application 308, of social network application 310, and of interaction processing/reporting application 312 are embodied in or under control of web server application 306. Web server application 306, discussion facilitator application 308, social network application 310, and/or interaction processing/reporting, application 312 may be implemented in a single executable or application or may be distributed among modules that differ in number and distribution of functionality from those described herein.

Figure 4A:
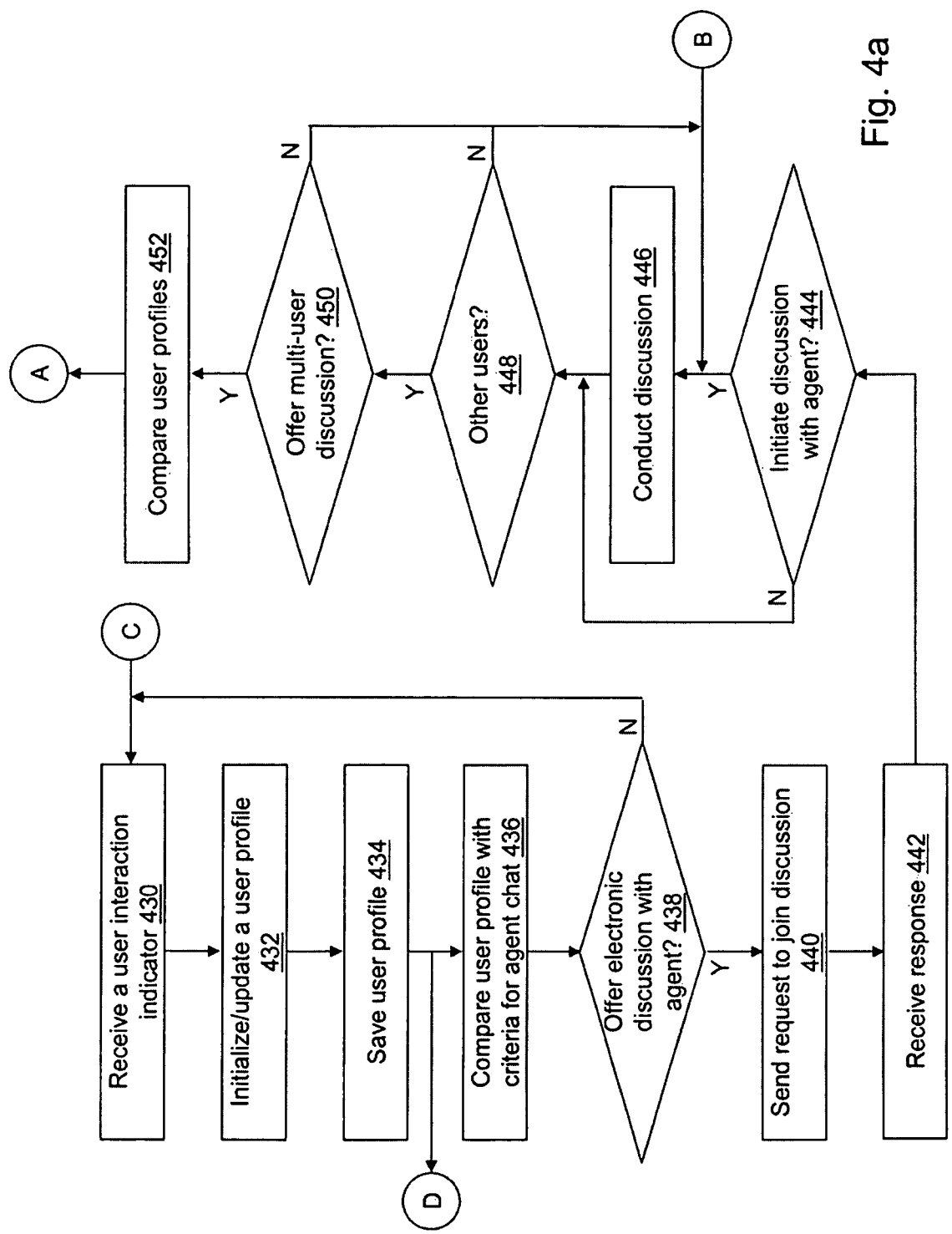
FIGS. 4a-4c are flow diagrams illustrating exemplary operations performed by a discussion facilitator application in accordance with an exemplary embodiment.
Figure 4B:
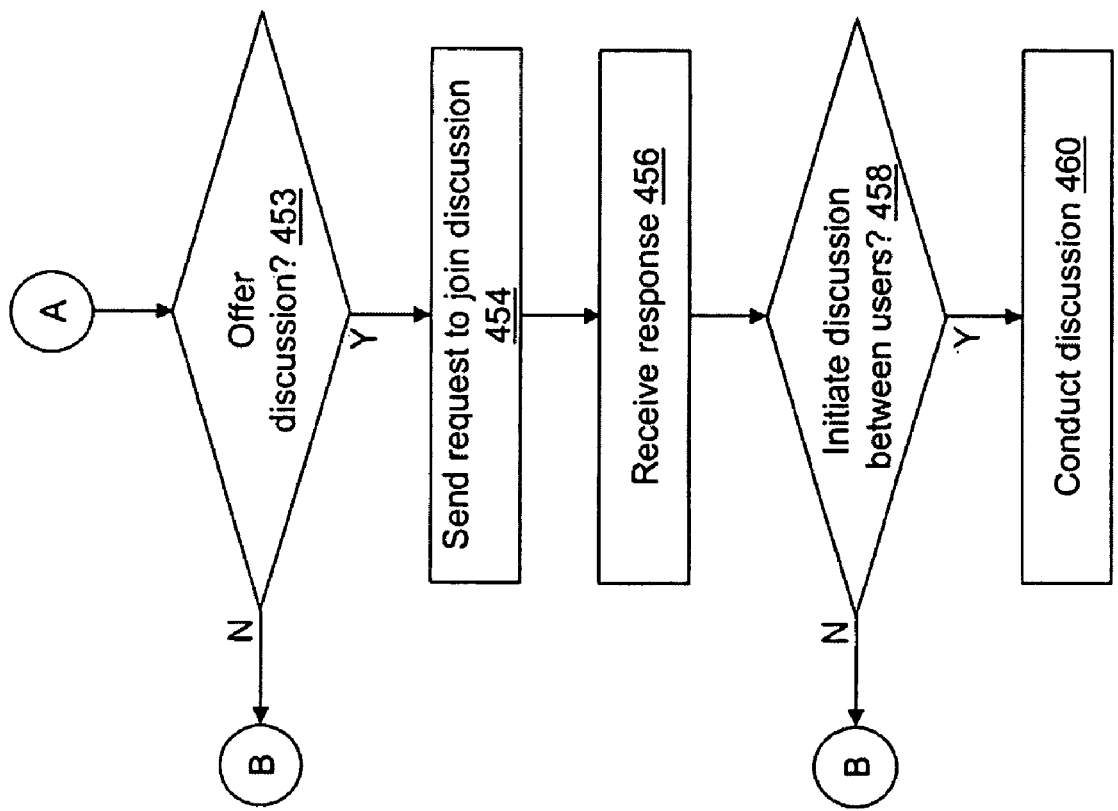
Figure 4C:
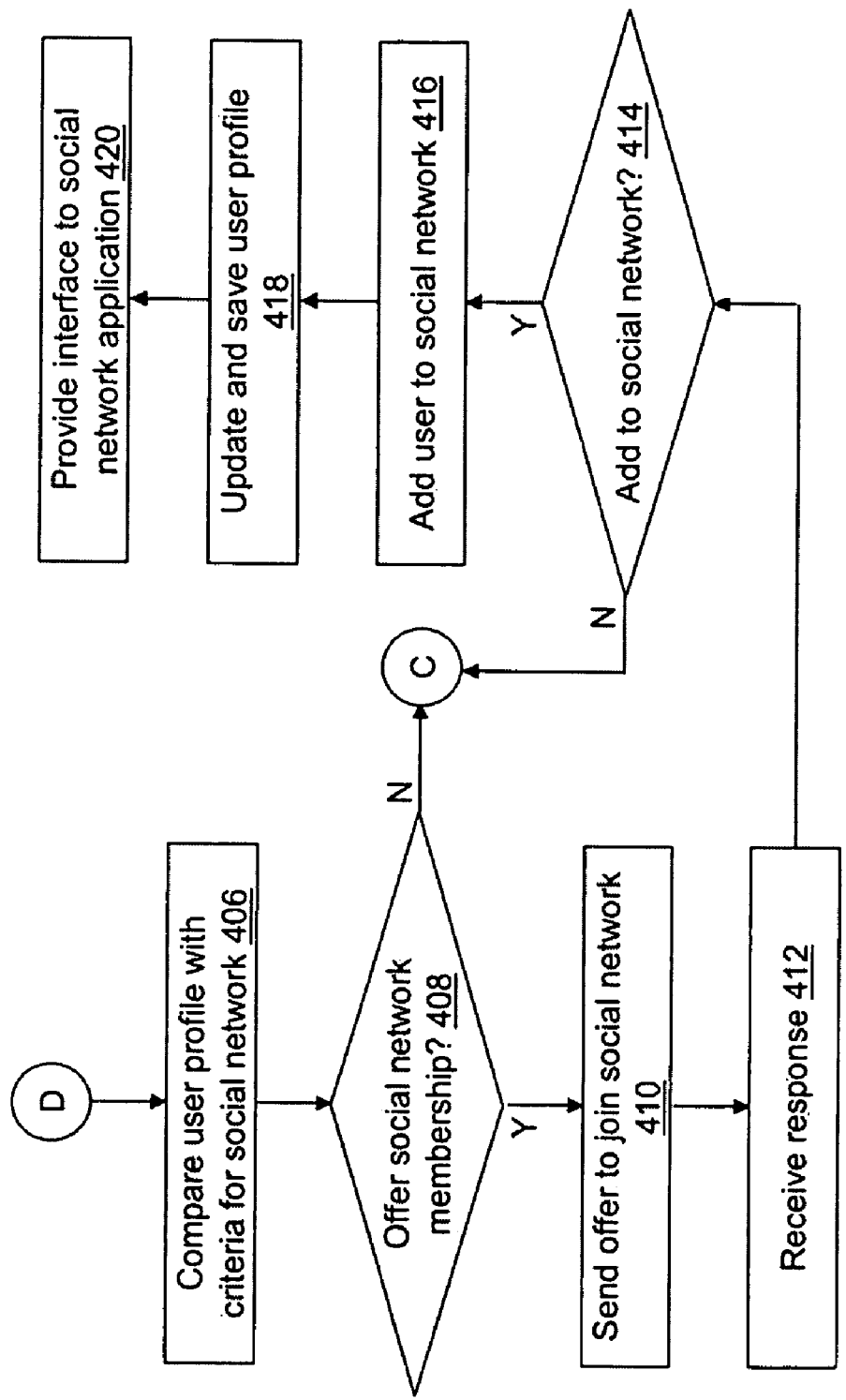

With reference to FIGS. 4a-4c, exemplary operations associated with discussion facilitator application 308 and web server application 306 are described. Additional, fewer, or different operations may be performed, depending on the embodiment. The order of presentation of the operations is not intended to be limiting. In an operation 430, a user interaction indicator is received at server 108 from user device 104a. For example, a user at user device 104a may be using a treatment cost estimator presented on output interface 200 using browser application 210 after accessing a website "MyHealth.com" hosted by web server application 306. Two general categories of users include individuals accessing the website that are employees of the company associated with the Website and those that are not employees of the company associated with the website. Options presented each category of user may differ.

In an exemplary embodiment, browser application 210 responds to operations of web server application 306 to cause presentation of information to a user of user device, 104a such as the treatment cost estimator. The user interaction indicator may include a variety of informational entities that can be captured relative to the user interaction with web server application 306 using browser application 210. For example, various data elements available from the user's interaction with a website include, but are not limited to, a search term entry, a data entry, a click stream, a URL selection, a website entry point, a website access time, Internet service provider, a login name, an exit point, and a cookie. Thus, the user interaction indicator may indicate that the user is using the cost treatment indicator and may include data associated with the cost treatment indicator. A treatment cost estimator is provided merely as an example interaction with a website that can be captured and/or identified. Any type of interaction with a website can be captured and utilized by web server application 306'.

In an operation 432, a user profile is initialized and/or updated based on receipt of the user interaction indicator. In an exemplary embodiment, as the user navigates the website, the user is logged into discussion facilitator application 308 using a background process. For example, discussion facilitator application 308 may include a chat server implemented using an extensible messaging and presence protocol (XMPP) such as Openfire, created by Jive Software. The chat client may be implemented using a Javascript jabber client as part of functionality supported by discussion facilitator application 308 and implemented by electronic discussion application 212. An agent also may be logged into the discussion facilitator application 308 such as the chat server. The agent is a computer generated entity that may be implemented using a, mark-up language such as an artificial intelligence mark-up language, XML, etc. In an exemplary embodiment, the agent is implemented as a Java program which includes instructions to interact with users using XMPP.

A series of user identifiers (IDs) may be pre-defined and stored, for example, in database 110 or database 120 or may be created randomly or dynamically based on information associated with the user. In an exemplary embodiment, when a user enters the website, the agent queries session data to determine which user IDs are in use, assigns an available user ID to the session, and logs the user into discussion facilitator application 308 using the assigned user ID. The agent monitors and tracks the user's interaction with the enabled website during their session by accessing and storing keywords associated with each enabled web page the user visits.

In an operation 434, the user profile information, which includes the keywords and the assigned user ID, may be stored, for example, in database 110 or database 120, accessible, by discussion facilitator application 308. Keywords can be read or identified from the website using a variety of mechanisms. For example, keywords can be read from <meta> tags placed on each Web page. In an exemplary embodiment, <meta> data with a predefined label may be associated with a web page and used to identify keywords. As another example, keywords can be read from the URL of each web page. Keywords also may be dynamically selectable from the text presented in the web page.

A field of the user profile may include the received user interaction indicator. In an exemplary embodiment, the website may require entry of a user login name and/or a password to access certain functionality of the website. The user profile may be associated with the login name and may be populated prior to the user's access of the website. The user profile may include a variety of data associated with characteristics of the user. Exemplary user profile items may include, but are not limited to:

Unique Identifier - alphanumeric locator that allows the system to identify data from individuals
First name
Last name
Middle initial
Chosen name
Income level
Hobbies
Top world concerns: global, local, personal
Favorite Websites
Trusted sources - personal, family, medical, financial, career
Marital status
Birthday
Company segment (segment identifier for user according to company assessment)
Company segment data items (criteria used to define segment for company)
Social network segment (segment identifier for user according to social network assessment)
Social network segment data items (criteria used to define segment for social network)
Ethnicity
Religion
Humor type
Health concerns
Risk profile
Favorite brands - personal, family -continued Email address
Contact preferences by topic
Hometown
City currently living in
Zip code
Sexual orientation
Political view
Interested in - advisors, friends, networking, education, read only, contribute and read, contribute only, etc.
Languages interested in
Languages spoken
Areas seeking to gain knowledge - personal, career, family
Fashion
Life events (births, deaths, marriages, medical diagnosis, etc.)
Smoking
Drinking
Pets
Living situation
Web page
Free form text
Journals
Groups/communities inside solution to which the user belongs
Groups/communities outside solution to which the user belongs
Picture to represent user
Passions
Sports
Activities
Books
Interesting facts
Share preferences
Occupation
Previous roles
Resume
Music
TV shows
Movies
Cuisines
IM user name
Jangle ID phone number
Address
Country
Photo
Wishlist - personal, family, local, global
Education
High school
College or university
Major
Degree
Year
Industry
Sub-industry
Company/Organization
Company web page
Title
Job description
Work - E-mail, phone
Career skills
Career interests
User headline for me (tag line defined by user to represent them to others)
First thing to know about me
Height
Weight
Eye color
Sign of the zodiac
Hair color
Sites I use regularly for commerce
Sites I use as source information
Topics I am currently interested in
Body art
Looks
1-10 rating on my appearance
Best physical asset
Least favorite body part
Turn ons
Turn offs
Best experience in my life thus far
What I am experiencing right now
Children
Things I would like to change
Ranking of things the user would like to change -continued Things I would like to learn
My list of 100 things I want to do
Things I would like to share
5 things I can't live without personal
5 things I can't live without work
The short term thing I am trying to solve
The long term thing I am trying to solve
Categories of communication I interact with
Categories of communication I only read
User interaction identifiers
My daily newspaper
Community contributor
My family's favorite activities
About my children
About my pets
Purchase history most recent
Service information
Support information
Other info on customers
Other company classifications
Customer status
Marketing preferences
Marketing items received
The thing I am trying to solve today
Top 10 list
My content
My research
Types of people I am trying to reach
Data presentation preferences In operation 436, the user profile is compared with criteria for inviting the user to have a discussion with the agent. In an operation 438, a determination of whether or not to offer the discussion with the agent is made based on the comparison. In an exemplary embodiment, the criteria may include a length of time spent on the website and/or keywords identified during the user's interaction with the website. For example, after the user's initial interaction with the website is detected through receipt of the user interaction indicator, a timer may be started. After a predefined time period, a determination may be made to make an offer to the user to participate in a discussion with the agent. An example time period is three minutes though any time period may be used and this example is not intended to be limiting. If the offer of the discussion with the agent is to be offered, processing continues at an operation 440. If the offer of the discussion with the agent is not to be offered, processing continues at operation 430. In operation 440, a request is sent to the user to join the discussion with the agent.

Figure 9:
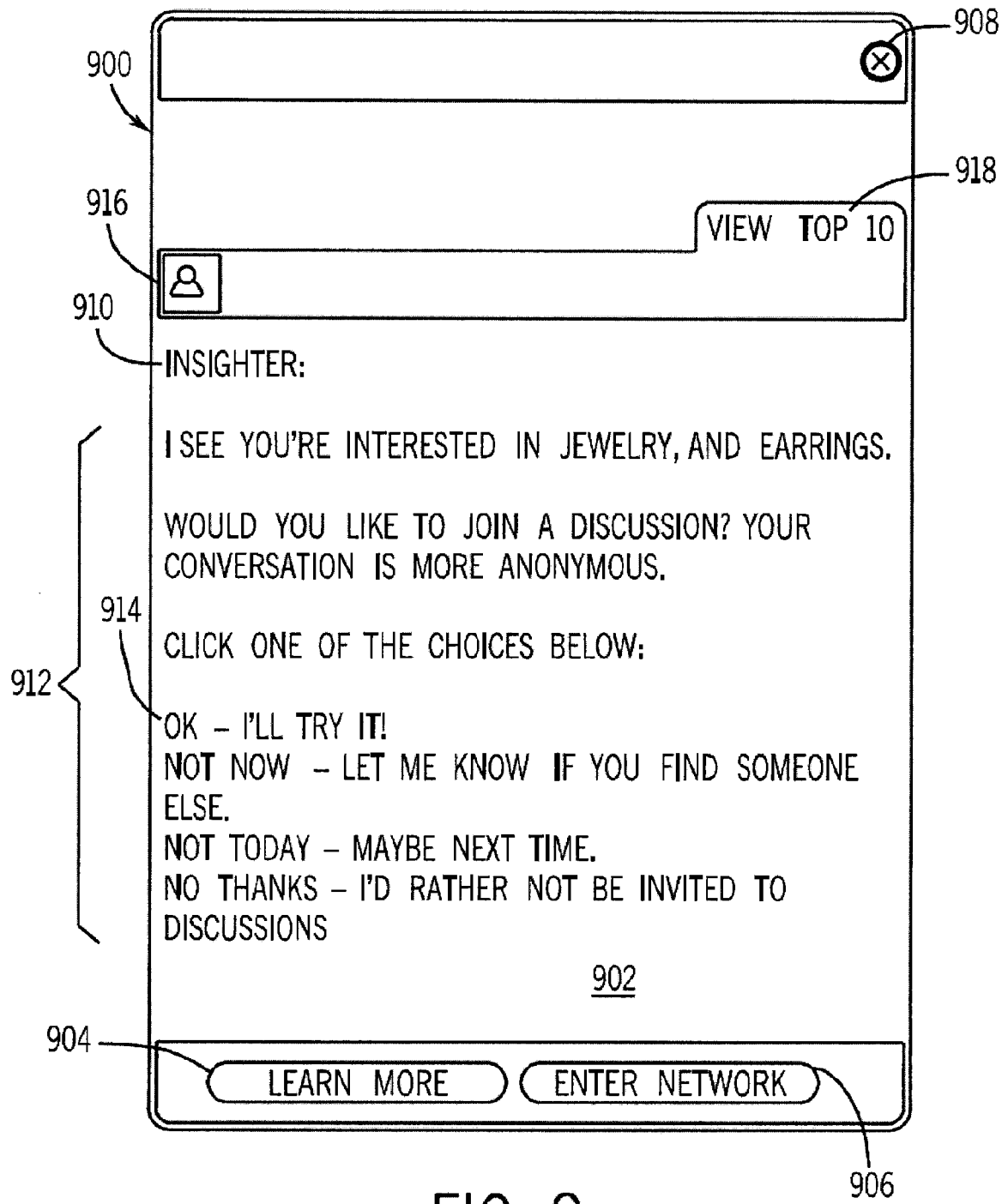
FIG. 9 depicts a second user interface of the electronic discussion system of FIG. 5 in accordance with a second exemplary embodiment.

For example, with reference to FIG. 9, a user interface 900 may be presented at user device 104a under control of discussion facilitator application 308 in accordance with an exemplary embodiment. User interface 900 may include a discussion initiation window 902, a "Learn More" button 904, an "Enter Network" button 906, a close button 908, and a "View Top 10" button 918. Discussion initiation window 902 may include a name 910 for the agent and an invitation 912. Name 910 identifies the agent in a subsequent discussion. Invitation 912 invites the user to join in the discussion with the agent. In the exemplary embodiment of FIG. 9, the invitation provides the user with a plurality of response options. For example, the user can select from response options that include a first response option 914 to join the discussion with the agent, a second response option to join a discussion with another user if another user is identified, a third response option to not join the discussion, but to be provided the option to join a discussion in the future, or a fourth response option to not receive any further discussion invitations. The response options may be selectable by the user using a variety of mechanisms as known to those skilled in the art such as selection of a hyperlink, button, menu item, etc. using input interface 202.

In an exemplary embodiment, user selection of "Learn More" button 904 prompts discussion facilitator-application 308 to present additional information to the user related to use of electronic discussion application 212. In an exemplary embodiment, user selection of "Enter Network" button 906 prompts discussion facilitator application 308 to present a login page to social network application 310 or to present a welcome page to social network application 310. In an exemplary embodiment, user selection of close button 908 prompts discussion facilitator application 308 to close user interface 900. User interface 900 further may include an agent icon 916 which identifies the agent as participating in the discussion. In an exemplary embodiment, user selection of "View Top 10" button 918 prompts discussion facilitator application 308 to present the top ten most active discussions conducted using social network application 310.

In an operation 442, a response is received from the user. In an operation 444, a determination of whether or not to initiate the discussion with the agent is made based on the received response. If the offer of the discussion with the agent is accepted, processing continues at an operation 446. If the offer of the discussion with the agent is not accepted, processing continues at operation 448.

Figure 10:
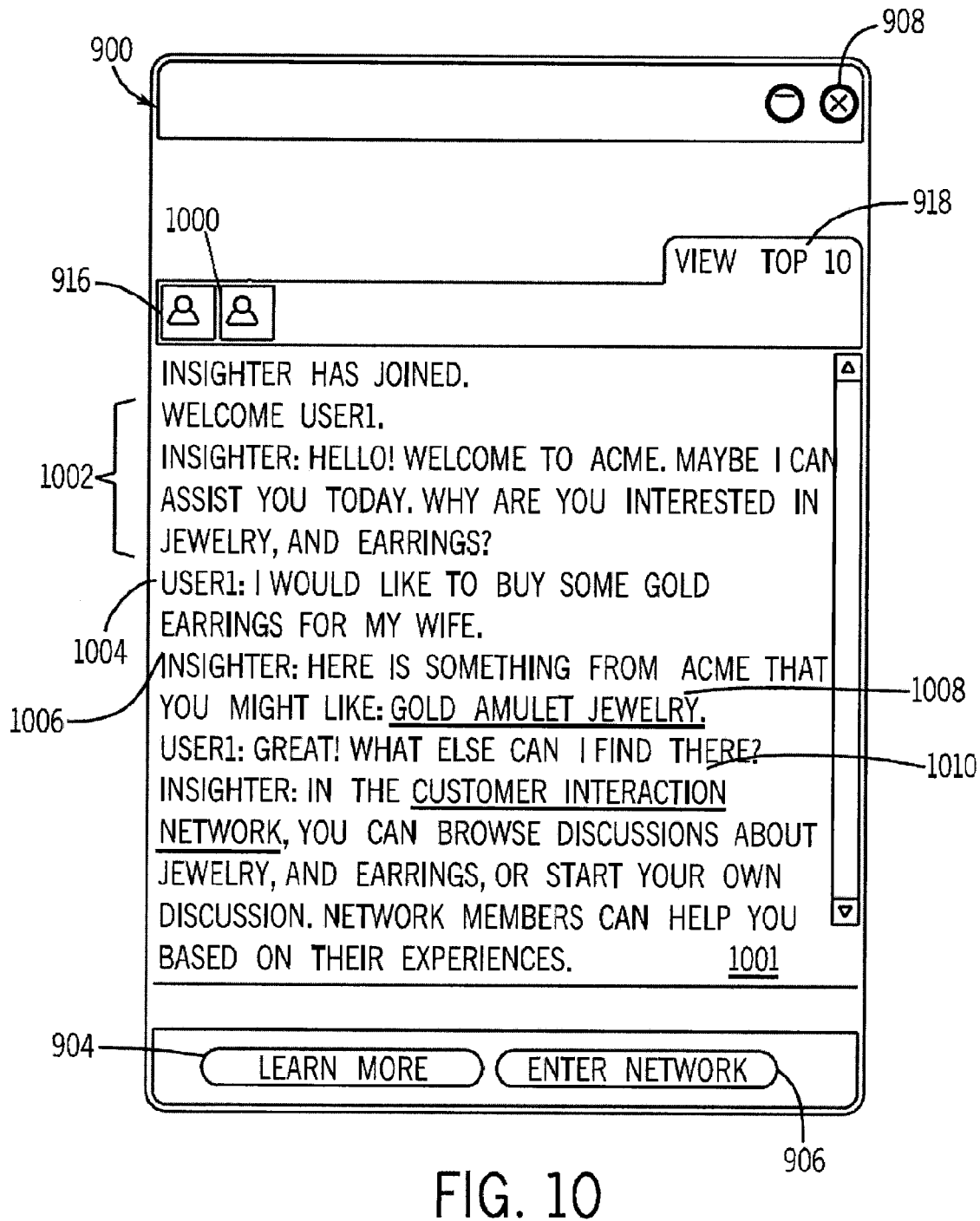
FIG. 10 depicts a discussion between a user and an agent using the second user interface, of FIG. 9 in accordance with an exemplary embodiment.

In operation 446, the discussion its initiated and conducted between the user at user device 104a and the agent. The discussion may be presented using browser application 210 or electronic discussion application 212. For example, after user selection of first response option 914, user interface 900, shown with reference to FIG. 10, may be presented to the user at user device 104a under control of discussion facilitator application 308. In the exemplary embodiment of FIG. 10, user interface 900 includes a user icon 1000 which identifies the user as participating in the discussion with the agent and a discussion text window 1001. Discussion text window 1001 may include a welcome message 1002 from the agent. Welcome message 1002 may include a question presented to the user based on information captured while the user accessed the website or a predefined question stored, for example, in database 110 or database 120. For example, the welcome message may ask a user why the user is interested in a particular type of product. The user then enters a response 1004 or user comment relative to welcome message 1002 in user interface 900. An agent follow-up response 1006 may include information related to response 1004. For example, agent follow-up response 1006 may include a product hyperlink 1008 to a product selected by the agent based on response 1004 and/or the information captured while the user accessed the website. Additionally, or in the alternative, agent follow-up response 1006 may include a hyperlink 1010 to social network application 310 based on response 1004 and/or the information captured while the user accessed the Website. Selection of hyperlink 1010 may take the user directly to a recommended discussion hosted by social network application 310 in a read-only mode or may take the user to a registration and/or login page of the social network hosted by social network application 310.

The agent scans responses of the user(s) for keywords and phrases using a natural language search engine to populate suggestions and answers and to return relevant information to the user. Thus, the agent attempts to gain enough information to make an intelligent product or discussion recommendation. For example, if a product match is found, the agent may respond with "Here is a product X from company Y you might like". If no product match is found, the agent may suggest that the user select "Enter Network" button 906 or hyperlink 1010 to look for more information. A user tag cloud may be generated from both the responses of the user and the keywords identified during the user's interaction with web server application 306 and/or discussion facilitator application 308. Recommendations may be presented to the user in the form of a hyperlink. In an exemplary embodiment, the tag cloud generation and product/discussion suggestion process is implemented as follows:

When a user accepts an electronic discussion, the session keywords and any discussion elements may be incorporated into a root word list which is "weighted" based on the number of times the root word is used in the discussion. For example, a user tag cloud between two users talking about Caribbean vacations might include: caribbean—5; travel—6; virgin—2; island—5; ship—1; etc. The text of the discussion may be evaluated as a word stream or as a series of sentences within a series of user comments. A list of "stop words, such as common words like "the", "my", "and", etc. may not be considered useful to the tag cloud and, as a result, may not be included in the tag cloud. The remaining words may be reduced to their root form to identify similar words in their most common form. For example, travel, traveling, and traveled may all be reduced to 'travel'.

In the social network associated with the website, discussions, which include a series of user comments, may have an associated tag cloud which is generated as the user's post comments to the discussion between users of social network application 310. In addition, a product list may be provided initially for recommendation to users during a discussion based on the website associated with the social network. The product list may include a product description and keywords defined for each product. The product list also may be included in a product tag cloud. During an electronic discussion, a comparison of the user tag cloud to the discussion tag cloud and/or product tag cloud is performed. In an exemplary embodiment, matching keywords are identified and a match value is calculated by adding the weights of matching root words. A product or discussion with the highest match value may be considered a best match. A threshold can be defined and associated with a product match and/or a discussion match. The threshold controls can be defined to make it easier or harder to identify a product or discussion for suggestion during the electronic discussion. For example, if the product threshold is set at "10" and the discussion threshold is set at "100", it is more likely that a product is recommended than a social network discussion during an electronic discussion.

Thus, as the user interacts with electronic discussion application 212, a user response or comment is received from the user by electronic discussion application 212 at user device 104a and ultimately by discussion facilitator application 308. A determination may be made-concerning whether or not a keyword is identified in the received response. Identified keywords are added to the user tag cloud associated with the electronic discussion that also may include interaction indicators identified during the user's interaction with the website. A suggestion may be inserted into the electronic discussion based on a comparison with the highest match value between the user tag cloud and a tag cloud associated with one or more suggestions and a match threshold value associated with the one or more suggestions. If the highest match value satisfies a comparison with the match threshold value, the suggestion may be sent, to the user devices participating in the electronic discussion as a suggestion by the agent.

Additionally, if a keyword is identified, a search may be executed by discussion facilitator application 308 using the identified keyword. For example, a search of the website may be executed. Alternatively or additionally, a search using a search engine such as the Google™ search engine may be executed. A determination of whether or not a matching search result was identified from the executed search is made. If a matching search result is identified, the matching search result is sent to the user at user device 104a and presented to the user for example using output interface 200. As an example, a link to a web page having information related to a topic of interest to the user is sent to user device 104a for presentation using browser application 210 or electronic discussion application 212. As the discussion is conducted with the agent, the user profile is updated and stored, for example, in database 110 and/or database 120.

Figure 11:
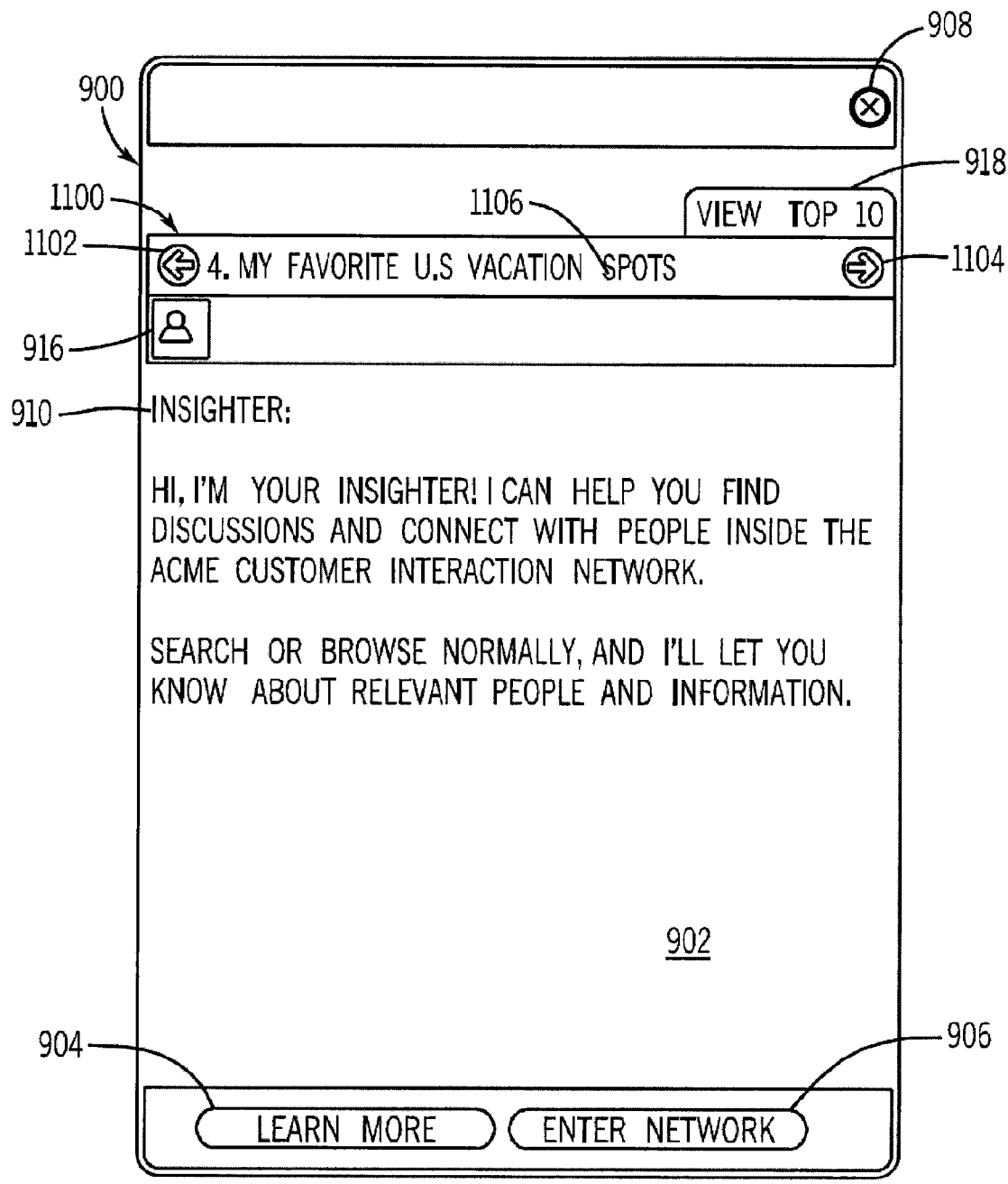
FIG. 11 depicts a "View Top 10" capability provided using the second user interface of FIG. 9 in accordance with an exemplary embodiment.

After user selection of "View Top 10" button 918, user interface 900, shown with reference to FIG. 11, may be presented to the user in output interface 200 under control of discussion facilitator application 308. In the exemplary embodiment of FIG. 11, user interface 900 includes a ticker-style display 1100. Ticker-style display 1100 may include a previous scroll button 1102, a next scroll button 1104, and a hyperlink 1106 to a selected one of the top ten currently most active discussions in social network application 310. User selection of hyperlink 1106 prompts discussion facilitator application 308 to present a login screen to social network application 310 or an initial screen for the discussion associated with the selected hyperlink 1106. A variety of different types of hyperlinks may be presented in ticker-style display 1100. A variety of mechanisms may be used to present the information as known to those skilled in the art.

In operation 448, a determination is made concerning whether or not other users are using the website. If no other users are using the website, the electronic discussion is continued at operation 446. If other users are using the website, processing continues at an operation 450. In operation 450, a determination is made concerning whether or not to offer the user participation in a multi-user discussion. In an exemplary embodiment, the criteria may include a length of time spent on the website and/or keywords. For example, after the users initial interaction with the website is detected through receipt of the user interaction indicator, a timer may be started. After a predefined time period, a determination may be made to make an offer to the user to participate in a multi-user discussion. An example time period is two minutes though any time period may be used. If no offer is to be made, the electronic discussion is continued at operation 446.

In operation 452, the user profile(s) of the other user(s) are compared with the user profile of the user at user device 104a. The comparison between the user profiles identifies users having similar interests and needs, for example, based on common keywords identified between the user profiles. The "match level" defined before multiple users are considered to have similar interests and can be invited to the same discussions may include multiple levels of keywords. As an example, a set of users on a site may be tagged as follows:
User1->Art
User2->Art:Glass:Bowls
User3->Art:Glass:Ornaments
User4->Furniture:Wood:Chairs:Rockers
User5->Furniture:Wood:Chairs:Barstools Based on the match-level threshold specified, the users may be 'matched' as follows:
Match Level=1 User1, User2, User3 invited to join Discussion A
and User4, User5 invited to join Discussion B.
Match Level=2 User2, User3 invited to join Discussion. A. and User4, User5 invited to join Discussion B
Match Level=3 User4, User5 invited to join Discussion A
Match Level=4 or 5 None of the users are invited to join a discussion.

In operation 453, a determination is made concerning whether or not to offer participation in a multi-user discussion to the user. In an exemplary embodiment, a match level of two is used to initiate a multi-user electronic discussion. If the offer of the discussion with the one or more other users is to be offered, processing continues at an operation 454. If the offer of the discussion with the one or more other users is not to be offered, the electronic discussion is continued at operation 446. In operation 454, a request is sent to the user to join the discussion with the one or more other users and the agent. An invitation and an introduction is made through the agent that translates information from the user profile and the user profile comparison into a welcoming statement to entice the user into the electronic discussion With the other users. In an operation 456, a response is received from the user by electronic discussion application 212 at user device 104a and ultimately by discussion facilitator application 308. In an operation 458, a determination of whether or not to initiate the discussion with the one or more other users and the agent is made based on the received response. If the offer of the discussion with the one or more other users and the agent is accepted, processing continues at an operation 460. If the offer of the discussion with the one or more other users and the agent is not accepted, the electronic discussion is continued at operation 446. In operation 460, the discussion is initiated with the user at user device 104a and continues until one or more of the users choose to exit the discussion. If users leave a multi-user discussion, the agent may attempt to engage the last remaining user in a single-user discussion using information from the previous discussion to make a product and/or discussion suggestion.

In an exemplary embodiment, the one or more other users may already be participating in an electronic discussion and the user at user device 104a joins the discussion. The discussion may be presented using browser application 210 or electronic discussion application 212. For example, with reference to FIG. 5, a user interface 500 of an electronic discussion system is shown in accordance with an exemplary embodiment. User interface 500 may include a search query section 502, an entity list 504, a discussion tracker 506, a user customization section 508, and a discussion text entry field 510. Search query section 502 provides interface elements that allow the user at user device 104a to conduct a search using terms and search criteria entered in search text box 512 upon selection of search execution button 514. Entity list 504 includes a list of the users that have been matched to each other and are currently participating in the electronic discussion. The list of the users includes agent 516 and one or more users 518. Discussion tracker 506 includes a user identifier 520, a time 522, a user comment 524, and a discussion scroll bar 526. User identifier 520, time 522, and user-comment 524 are associated with each comment made by a user participating in the discussion. Discussion scroll bar 526 allows the user at user device 104a to review the entire discussion.

User customization section 508 may include a user name text box 528, a user name change button 529, a user icon selector 530, a profile viewer button 532, and a profile editor button 534. User name text box 528 displays a name of the user at user device 104a. The name is associated with the user and is displayed for the user in entity list 504 and for the user in user identifier 520. The user can edit their name by selecting user name change button 529. Selection of user name change button 529 causes a text box to be presented to the user. The user can enter a desired name in the text box. Selection of user icon selector 530 allows a user to select an icon included in entity list 504 to represent the user. For example, the user may select from an icon indicating that the user is female or is male. Selection of profile viewer button 532 allows the user to view their user profile. Selection of profile editor button 534 allows the user to edit their user profile. The user participates in the discussion by entering comments in discussion text entry field 510. The user comments may include a plurality of sentences which each include a plurality of words. A discussion or discussion includes a plurality of user comments. A plurality of discussions May be monitored by electronic discussion application 212 and/or social network application 310 at the same time and/or at different times. The plurality of discussions may be stored in database 110 and/or database 120 for processing by interaction processor/reporting application 312. The text of each user comment may be associated with the discussion, with the website accessed, with the user making the comment, with the time and/or date, etc.

Figure 5:
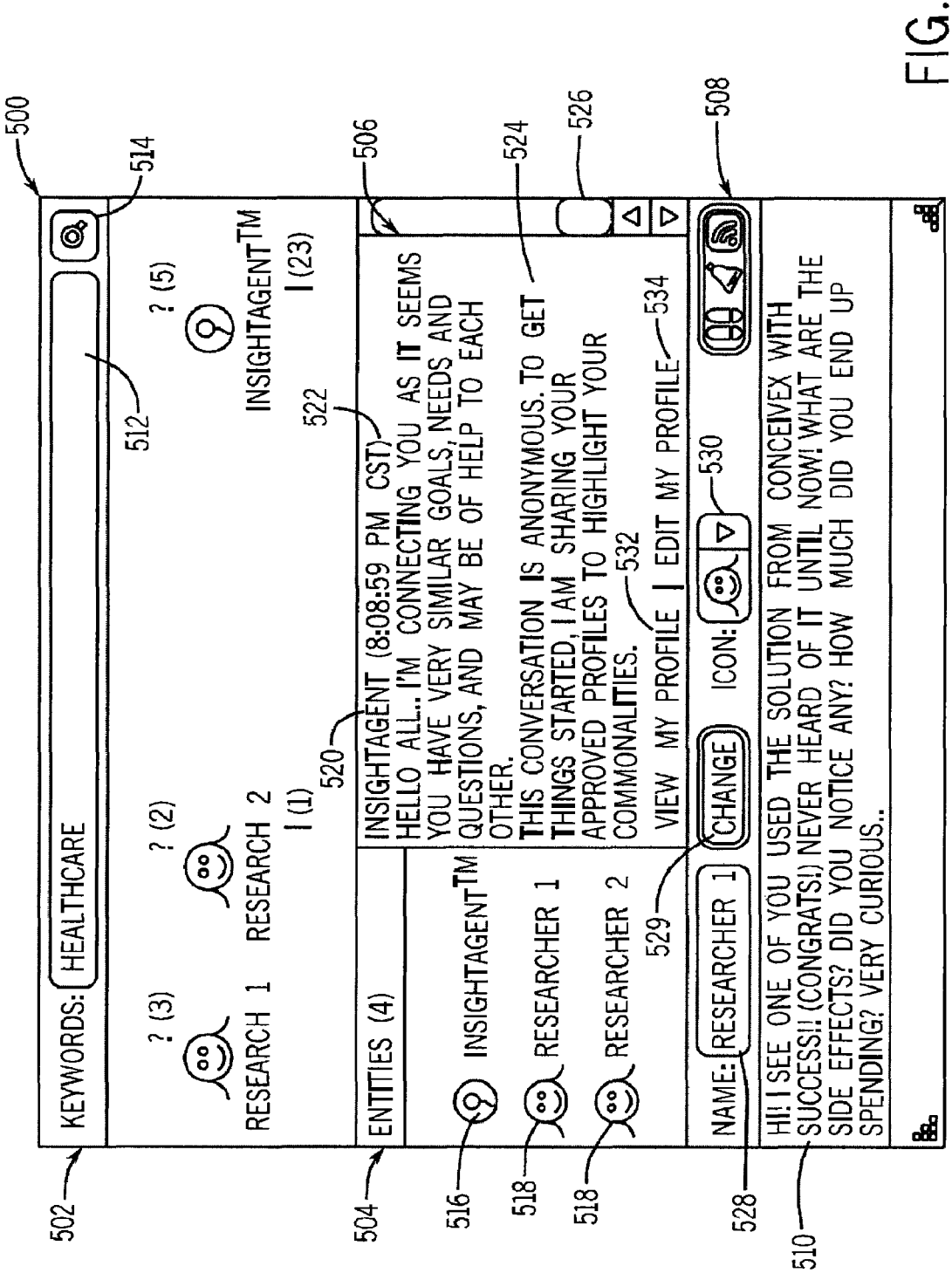
FIG. 5 depicts a user interface of an electronic discussion system in accordance with an exemplary embodiment.
Figure 6:
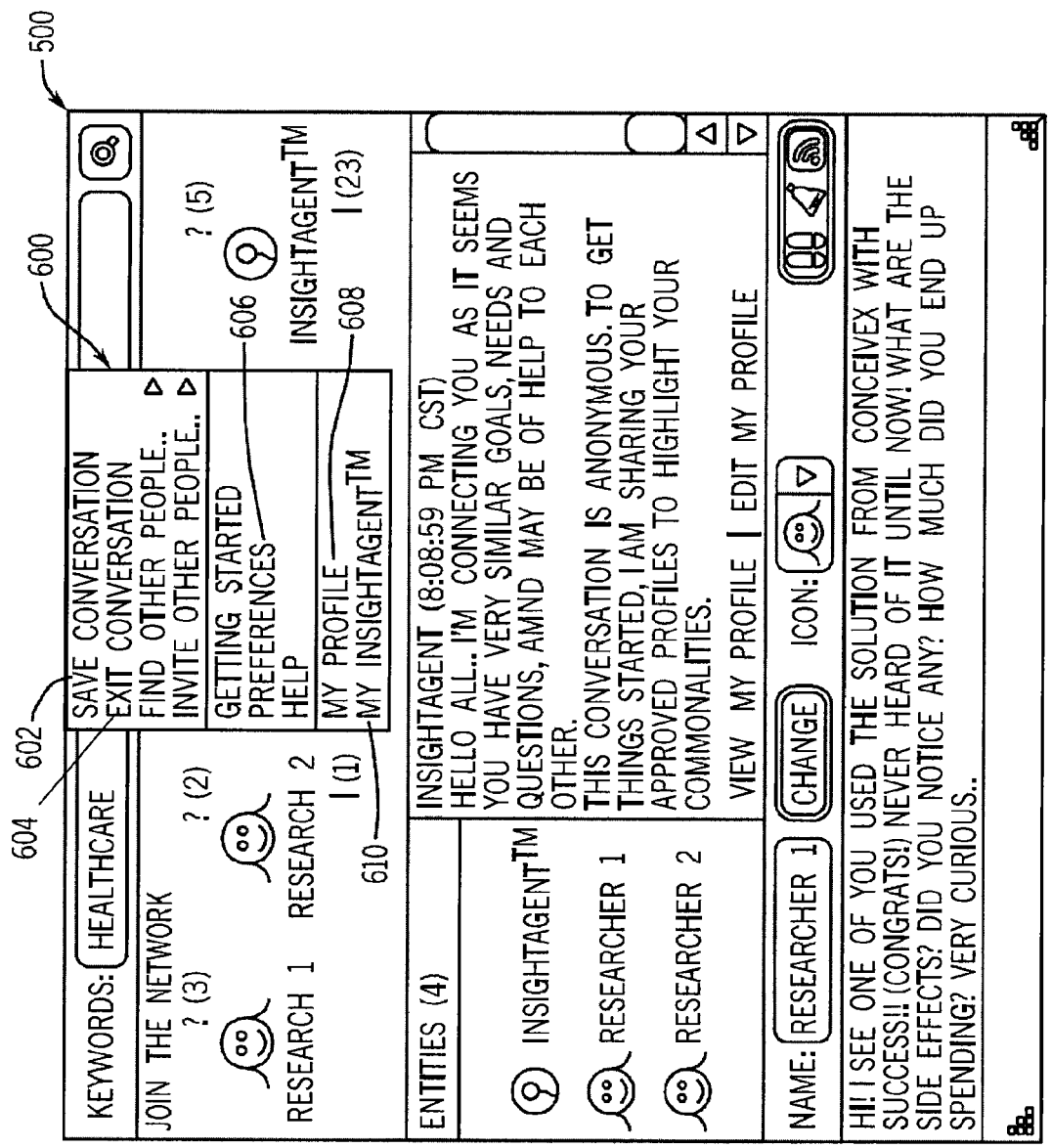
FIG. 6 depicts a menu of the user interface of FIG. 5 in accordance with an exemplary embodiment.

With reference to FIG. 6, a menu 600 of the user interface of FIG. 5 is shown in accordance with an exemplary embodiment. Menu 600 may include a discussion save item 602, a discussion exit item 604, a preferences edit item 606, a profile edit item 608, and a agent edit item 610. The items included in menu 600 may differ based on whether or not the user has joined the social network or not. Selection of discussion save item 602 saves the discussion, for example, to database 110 and/or database 120. The saved discussion may be associated with one or more of the user, the website, the discussion, etc. Selection of discussion exit item 604 ends the user's participation in the discussion which may continue with any remaining users. Selection of preferences edit item 606 presents options from which a user may select preferences associated with use of menu 600. Selection of profile edit item 608 presents the user profile to the user for editing. Selection of agent edit item 606 presents options to the user related to the agent.

In editing the user profile, a user may have the option to select one or more anonymity level. In an exemplary embodiment, the user may select sub-networks/groups of the social network in which the user's profile may be shared. Additionally, or in the alternative, the user may select each item of the user profile which may be shared. In this way, the user has control of the data captured during interactions with the website and/or the social network. The user may select the anonymity levels by selecting preferences edit item 606, profile edit item 608, and/or agent edit item 606.

The agent listens to the discussion and inserts comments as appropriate based on the discussion. For example, a tag cloud is created which represents what the users are discussing. The tag cloud also may include the keywords used to identify the users and to initiate the invitation to enter the discussion. The tag cloud may be periodically compared to a listing of products that may be associated with the website, and/or to the content of discussions within a social network associated with the website. When a match is identified, the agent suggests the products to the discussion participants. Product links may take the user directly to the product page. Discussion links may cause presentation of a login page of social network application 310 or of a welcome page to social network application 310. The frequency of interjections by the agent in the multi-user discussion may be dynamic and configurable. For example, if the users are actively conversing, the agent may only interject with suggestions every 'X' number of comment exchanges between the discussion participants. If the users stop actively conversing, but do not actually exit electronic discussion application 212, the agent may interject suggestions every 'Y' number of seconds. The timer resets each time a user makes a comment.

An exemplary discussion may include the following series of user comments:

Agent: Hi, I asked you all here because you have similar needs and interests. Hopefully, you can be of some help to each other. Remember this discussion is anonymous, and the only thing you know about each other is your common reason for visiting MyHealth.com.

User 2: Hi

User 1: my husband and I have been struggling to have our first child so we have opted for fertility treatment—do you know how much it costs?

User 2: Me too, we have one child and are trying for our second

User 3: Hi We decided after trying to get pregnant that we would look into adoption, we might still go down the path of fertility treatment but we will see.

User 2: My doctor told me the initial visits cost about $2,000 but the total is around $10,000

User 1. WOW!: Are there any other options before going to the fertility treatment?

Agent: Here is some useful information on the costs of fertility http://www.myhealth.com/fertility-pages/fee.html User 3. We tried a new product with our first child—we tried to get pregnant and struggled and our friend recommended this company called Conceivex, they have a solution that basically allows you to place the semen right next to the cervix. It worked for us and we had been struggling for 2 years.

Agent: Information on Conceivex can be found at http://www.conceptionkit.com/

User 2. I have not heard of that I should check it out

User 3. Do either of you know of any good sources that talk about adoption and health, coverage Agent: adoption and health coverage information can be found through our partner at http://www.nefe.org/adoption/adopt.pgs/expc.html Agent: MyHealth has a social network of people that are discussing fertility and other topics related to infertility if you would like to join please click Join below and start interacting with a wider community with more information.

In parallel with the operations described with reference to operations 436-460, or separate from the operations described with reference to operations 436-460, the operations described with reference to FIG. 4c may be executed. In an operation 406, the user profile is compared with criteria for inviting the user to join a social network/sub-network/group. Use of the term social network includes any sub-networks and/or groups and is not intended to be limited to merely social interactions. For example, the interactions could be work related. In an operation 408, a determination of whether or not to offer membership in the social network is, made based on the comparison with the criteria. For example, membership may be based on an evaluation of one or more user profile attributes. If the offer of membership in the social network is to be offered, processing continues at an operation 410. If the offer of membership in the social network is not to be offered, processing continues at operation 430.

In operation 410, an offer to join the social network is sent to the user at user-device 104a. For example, the offer is presented to the user of user device 104a in a user interface of browser application 210. In an operation 412, a response is received from the user at user device 104a. For example, user selection of a "Yes" button or of a "No" button may be received. In an operation 414, a determination of whether or not to add the user to the social network is made based on the received response. If the offer of membership in the social network is accepted, processing continues at an operation 416. If the offer of membership in the social network is not accepted, processing continues at operation 430. In operation 416, the user is added to the social network. For example, a user name and a password may be requested from the user. Additionally, a request may be sent to the user at user device 104*a* to enter or to modify data entered in the user profile. Attributes of the user profile may be automatically entered, but can be modified by the user. Both entries may be saved together or separately. Before presenting the user profile to the user, the user may be asked how long they want to spend in completing their user profile. If no attributes of the user profile are received from the user at user device 104*a*, a prompt may be sent to the user to enter required attributes of the user profile. In an operation 418, the user profile is updated and saved.

A plurality of user profiles may be maintained for each user of the social network. For example, a company profile, which generally already exists, may be defined based on user membership in an organization. For example, a user company profile may be defined for a user that is a member of a health care organization. A second user profile may be developed through user interaction with the website, electronic discussions with the agent or other users, etc. The user profile data elements may be populated automatically as they are identified by the agent based on interactions with the user at various points in time. Additionally, the agent may ask a series of questions about the user during these interactions. The user's answers may be used to populate both user profiles.

Figure 7:
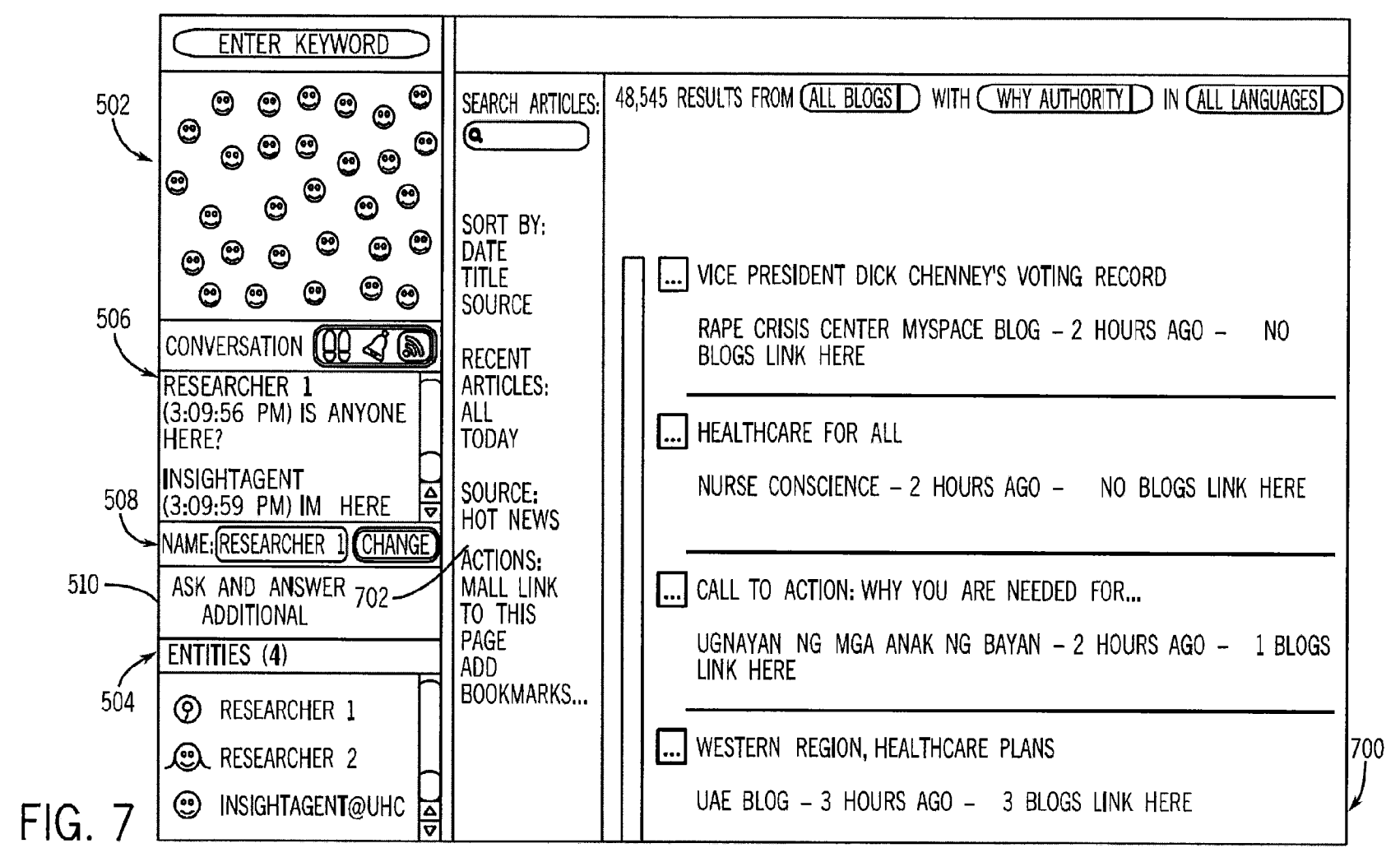

In an operation 420, the user at user device 104*a* is provided with a user interface to social network application 310. In an exemplary embodiment, User 1 and User 2 decide to join the social network and are directed to a group already discussing fertility through blogs, postings, and other information accessible using social network application 310. With reference to FIG. 7, a user interface 700 of social network application 310 is shown in accordance with an exemplary embodiment. Social network application 310 provides a complete social networking solution in which users can interact with other users, share content, view their community, etc. These interactions may be driven by search, by profile matching, by keywords, by discussion contributions, etc. User interface 700 may include a series of dynamic viewers that update with a depiction of others that are in the social network to allow users to identify other users of interest. For example, if a user is searching on "World War II" within the social network, user interface 700 may show the groups, individuals, and content rooms closest to the user that have direct relevance to the search topic. Individuals, groups, and content rooms interested in "World War I" may also be shown, but at a greater distance from the user and with less emphasis. Groups, individuals, and content rooms interested in "World War II" and having the closest match based on user profile attributes may be emphasized in user interface 700.

User interface 700 May be presented in browser application 210 and/or electronic discussion application 212 at user device 104*a*. For example, user interface 700 may be accessed by the user using browser application 210 and a URL associated with the website. User interface 700 may include search query section 502, entity list 504, discussion tracker 506, user customization section 508, discussion text entry field 510, and an information presentation section 702. The agent also participates in the social network. The agent listens to the discussion and inserts comments as appropriate based on the discussion. Information presentation section 702 provides additional information to the user such as a blog related to a topic, of interest to the user. User-interface 700 additionally may include a user profile manager, a session record capability, an invite others capability, an internal search capability, and an external search capability.

Through use of discussion facilitator application 308 and social network application 310, interactions with and between users can be monitored throughout an entire product adoption process. A product adoption process may include 1) identifying a need, 2) investigating solutions to the identified need, 3) evaluating the solution options, 4) selecting a solution from the solution options, 5) integrating/implementing the selected solution, 6) using the integrated solution, 7) measuring the performance of the solution, and 8) referring other to the solution. Users identify their needs by visiting, a Website to look for solutions. Discussion facilitator application 308 and social network application 310 support interactions that help users identify solutions to their needs through interactions with others and/or through interactions with the agent.

Figure 8:
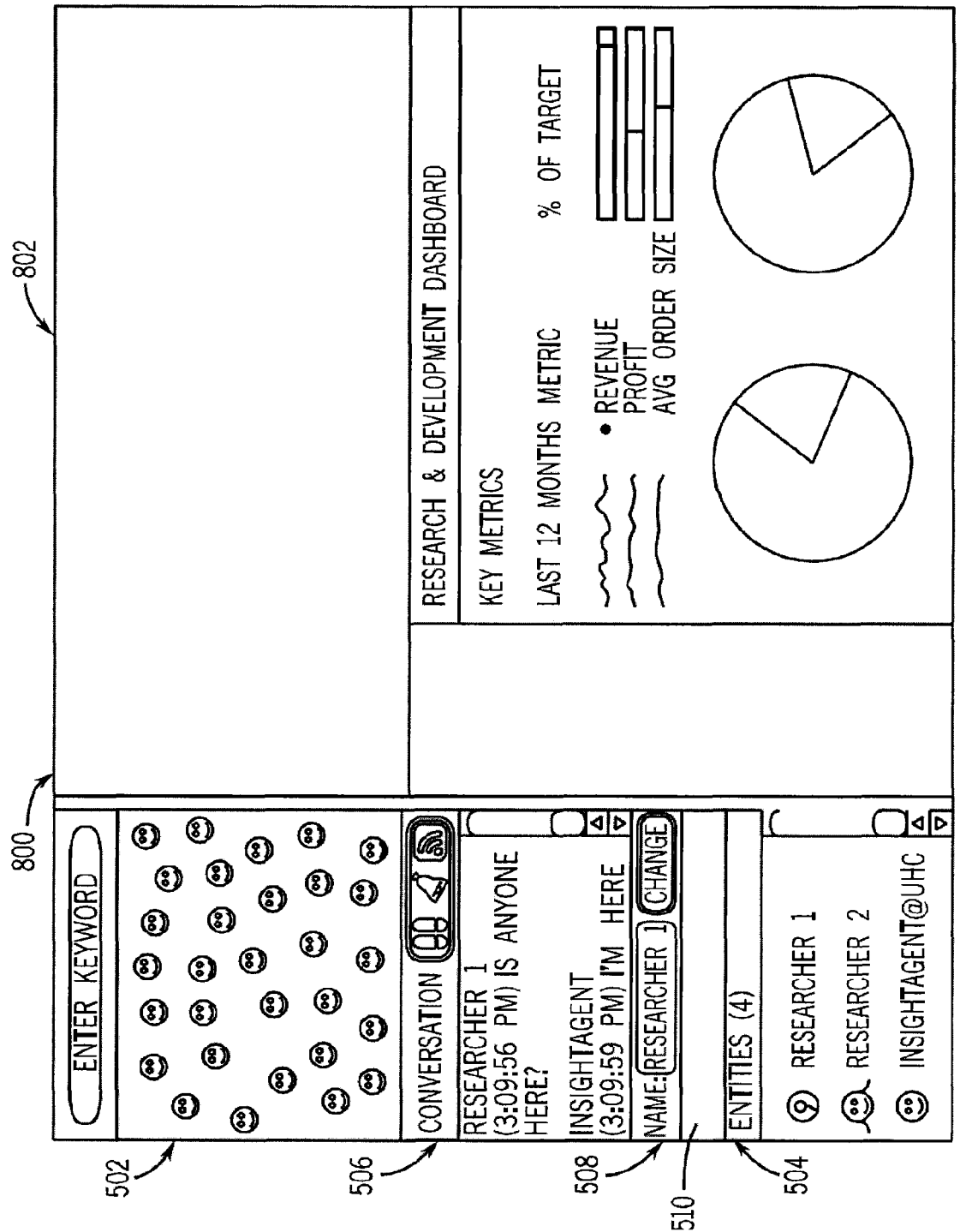
FIG. 8 depicts a user interface of an interaction processing and reporting application in accordance with an exemplary embodiment.

With reference to FIG. 8, a user interface 800 of interaction processing/reporting application 312 is shown in accordance with an exemplary embodiment. User interface 800 may be presented at server 108. User interface 800 also may be presented in browser application 210 at user device 104*a*. Interaction processing/reporting application 312 provides a visual representation of the data elements captured during interactions. These data elements may be personalized using an electronic job description of an employee who is the user of interaction processing/reporting application 312. Additionally, an annual review itemizing areas in which the employee is working and a personal interests description based on searches and interactions the employee has during their tenure with the company may allow personalization of the data elements. If the user is not an employee, the data may be personalized using the user profile. Characteristics of user interface 800 of interaction processing/reporting application 312 may differ for users that are employees as compared to users that are not employees. The same or different users may access one or more of discussion facilitator application 308, of social network application 310, and of interaction processing/reporting application 312.

User interface 800 may include search query section 502, entity list 504, discussion tracker 506, user customization section 508, discussion text entry field 510, and a network information presentation section 802. Network information presentation section 802 allows a user to visualize what is happening in the network using data mining tools, a natural language search engine, and personalized data analyzers. The data presented in user interface 800 may be updated as the information in the user profiles and from the user discussions is received. For example, a user works in MyHealth's marketing group and uses interaction processing/reporting application 312 to access daily reports associated with their area of responsibility. Thus, the user of interaction processing/reporting application 312 may be an employee of the company associated with the website or a user obtaining information from or associated with the website. The user of interaction processing/reporting application 312 obtains reports based on interactions with the website, with the agent, with the other users of the website, and/or with the social network. Preparation of the reports may include use of data filters, use of viewers, and use of data mining tools that are driven by keywords and nontrivial events that happen within the social network. An adoption process indicator associates each user interaction indicator with an indicator that determines its phase in the adoption process to determine the amount and types of resources a user may invest in a particular stage in the process.

In an exemplary embodiment, interaction processing/reporting application 312 may include a filtering tool that allows users to mine the most discussed/searched topics in the social network and communities within the social network. For example, the most discussed topics may be determined based on a frequency of additions and/or a frequency of hits. The most discussed topics may be filtered by segment, by demographic group, by community, by social network, by location, etc. The segment may be defined by a company segmentation schema and data structure through integration of the company's data structure with the user profile. The demographic group may be defined based on the user profile. As another example, a least discussed, but most frequently visited topic may be determined.

In an exemplary embodiment, interaction processing/reporting application 312 may include a search tool that can perform searches based on a keyword, related phrases, a product, a segment, a purchase, a transaction, a fad topic, etc. For example, a time that a fad topic remains of interest may be determined using the search tool. The search functionality may be provided to a user of user interface 800 of interaction processing/reporting application 312, to a user of user interface 700 of social network application 310, and/or to a user of user interface 500 of the electronic discussion system.

In an exemplary embodiment, interaction processing/reporting application 312 may include an extended network analyzer tool to understand the influencers, advisors, and relationships that members of the social network have. These can include other social networks, companies, non-profits, blogs, etc. A cookie may be created to track the entry and exit points of each member of the social network. The entry and exit point information may be categorized and sorted by community, by segment, and/or by topic. Using this information, relevant websites may be identified. The identified relevant sites may be searched automatically. Additionally or in the alternative, the extended network analyzer tool may search the social network for websites identified by users in their profiles, in their personal pages, in their scrapbooks/file, cabinets, and in their communities.

In an exemplary embodiment, interaction processing/reporting application 312 may include a community demographics characterization tool to understand the similarities of members of communities within the social network. The community demographics characterization tool helps understand potential new segments, segments belonging to communities, needs of community members, the adoption process stage, etc. For each community, a summary profile may be created to summarize the profiles in the community. The various types of profile data are translated into the various stages of the adoption process. The stage in the adoption process may be determined by an evaluation of a purchasing history, of a number of interactions with customer service, of a total number of interactions with the company (online and offline), of interactions associated with a topic, of a number of trusted advisor interactions, of trusted advisor classifications present in the community, etc.

In an exemplary embodiment, interaction processing/reporting application 312 may include a segmentation tool to identify how segments evolve in a community so that new and emerging needs can be identified; new product/service opportunities can be uncovered; current products not meeting user needs can be identified, etc. User profiles, may be linked to a current segment of the company associated with the user. Segmentation may also be based on the community; on community needs, on a segment value proposition based on what the community values, on a segment based on an unmet community need, on the adoption cycle, etc.

In an exemplary embodiment, interaction processing/reporting application 312 may include a marketing tool that creates strategic marketing insights and that supports tactical marketing decisions. The marketing tool may provide search engine optimization analysis based on the most searched topics of the community and/or the most relevant topics and types of communication users want. Transaction data may be linked to the most frequently used and searched topics.

In an exemplary embodiment, interaction processing/reporting application 312 may include a questionnaire/survey tool to poll the social network. Polling may be conducted by a user of user interface 800 of interaction processing/reporting application 312 and/or by a user of user interface 700 of social network application 310. Permission may be obtained from the communities and/or individuals to use the questionnaire/survey tool. Limits may be set by the creator of the community relative to the complexity of the questionnaire or survey such as the number of questions, the number of multiple choice versus free form answers, etc., relative to who can create a questionnaire, relative to a frequency of surveys, etc. In an exemplary embodiment, interaction processing/reporting application 312 may include an evaluation tool that allows reports to be generated from the survey answers. Survey answers may be grouped by characteristics of users, communities, and segments.

In an exemplary embodiment, interaction processing/reporting application 312 may include a panel tool that supports a continuous active interaction between a company and customers. For example, an employee of the company may invite social network members to a panel event.

In an exemplary embodiment, interaction processing/reporting application 312 may include a marketing understanding tool to help companies understand what mechanisms to use in communicating with customers, who customers consider trusted sources, when to communicate with customers, how often to communicate with customers, and/or how to protect communication information. The marketing understanding tool mines discussions to understand the types of discussions customers want to have. The types of discussions may range from burst (short snippets of information) to in-depth (large pieces of information that provide all relevant info). Marketing statistics data may be used in combination with data from the social network to understand the frequency of communication that segments or members want.

In an exemplary embodiment, interaction processing/reporting application 312 may include a competitive analysis tool to provide a customer perspective of the competition. The competitive analysis tool may include a graphical display showing the valuation of the competition based on discussions within the network and by specific segments. The competitive analysis tool may include a competitive profile developed based on feedback from the social network. The competitive analysis tool may include a bulletin created when a competitor or a competitor's product/service has a high level of interest or discussion within the social network. The competitive analysis tool may include a competitive product/service value evaluation based on complaints about the competitive product/service. The competitive analysis tool may provide an evaluation of competition by segment. The competitive analysis tool may include a favorite solution for a problem.

In an exemplary embodiment, interaction processing/reporting application 312 may include a product/service discussion tool to provide insight into the current use, problems with, positive attributes of, support for, and, new opportunities for products and services. The product/service discussion tool may evaluate product use for a segment, a community, or a smaller grouping by combining company purchase data, customer company product/service interactions, and the product/service discussion data in the community. The product/service discussion tool may evaluate how well needs are being met by products/services using the most discussed topics by segment/community. Additionally, the user interaction data may be searched automatically for the company's product names and the competitor's product names.

In an exemplary embodiment, interaction processing/reporting application 312 may include a loyalty identification tool to determine where a customer fits on the loyalty spectrum based on their willingness to solve their needs with solutions provided by the company. When a user is tagged as having reached the advocacy stage in the adoption process, the user is identified and the company is made aware of their loyalty value. A lifetime value of a customer can be determined based on their interactions and how loyal they are.

In an exemplary embodiment, interaction processing/reporting application 312 may include a marketing automation tool to create marketing collateral that can be delivered to the network. The marketing automation tool may identify a list of constituents for which the marketing collateral is relevant. The marketing automation tool may measure the success of a marketing campaign, for example, based on a discussion rate, a discussion longevity, and a time from mailing to generation of a discussion related to the campaign.

In an exemplary embodiment, interaction processing/reporting application 312 may include a relationship and data visualization tool to provide a variety of views of different segments of the social network. The different views may be determined based on data contained within a user profile.

In an exemplary embodiment, interaction processing/reporting application 312 may include a sales and business development tool to provide new types of data to both sales and business development. The new types of data may be linked to a group of customers or a specific customer and may, detail the topics/areas of concern for a specific customer to identify customer needs, product usage, emerging needs, competitive perception, customer strategies, etc. A high level report for business development may identify other companies being discussed in the social network and the context in which they, are relevant.

Figure 12:
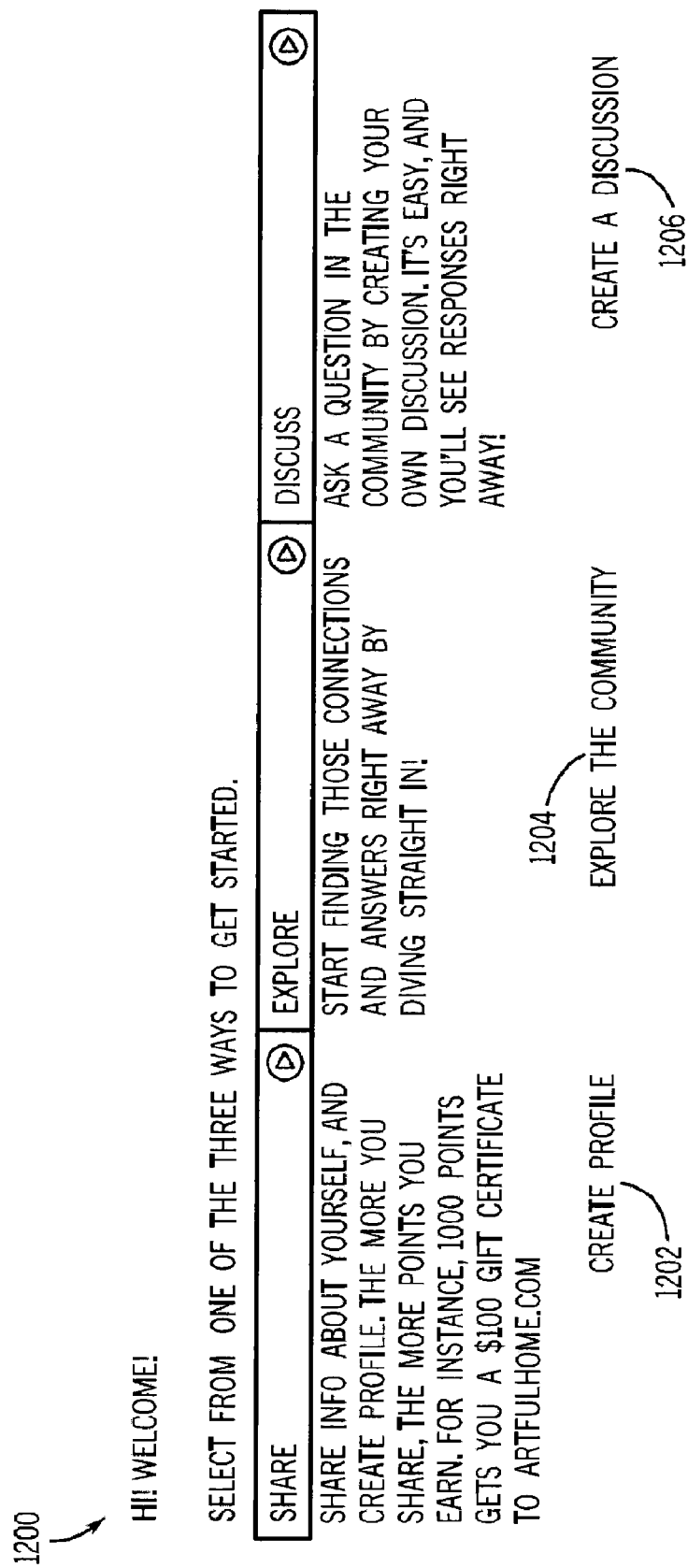
FIG. 12 depicts a welcome user interface for a social network application in accordance with a second exemplary embodiment.

With reference to FIG. 12, a user interface 1200 of social network application 310 is shown in accordance with a second exemplary embodiment. User interface 1200 may be presented in browser application 210 at user device 104*a* for example, after receiving an indicator indicating user selection of a hyperlink in a web page. In response to receiving the indicator, a user may be prompted to login to the community. A new user may be prompted to register and may be provided a user name and password after completing a registration process. For example, the user may be sent the user name and/or password in an e-mail message. As another alternative, the user may enter an e-mail, address as a user name and select a password through interaction with social network application 310. In an exemplary embodiment, user interface 1200 is presented to the user at user device 104*a* after the user registers to use the social network associated with the community. The user can create a user profile by selecting a "Create Profile" hyperlink 1202. The user can explore the community by selecting an "Explore the Community" hyperlink 1204. The user can create a discussion by selecting a "Create a Discussion" hyperlink 1206.

Figure 13:
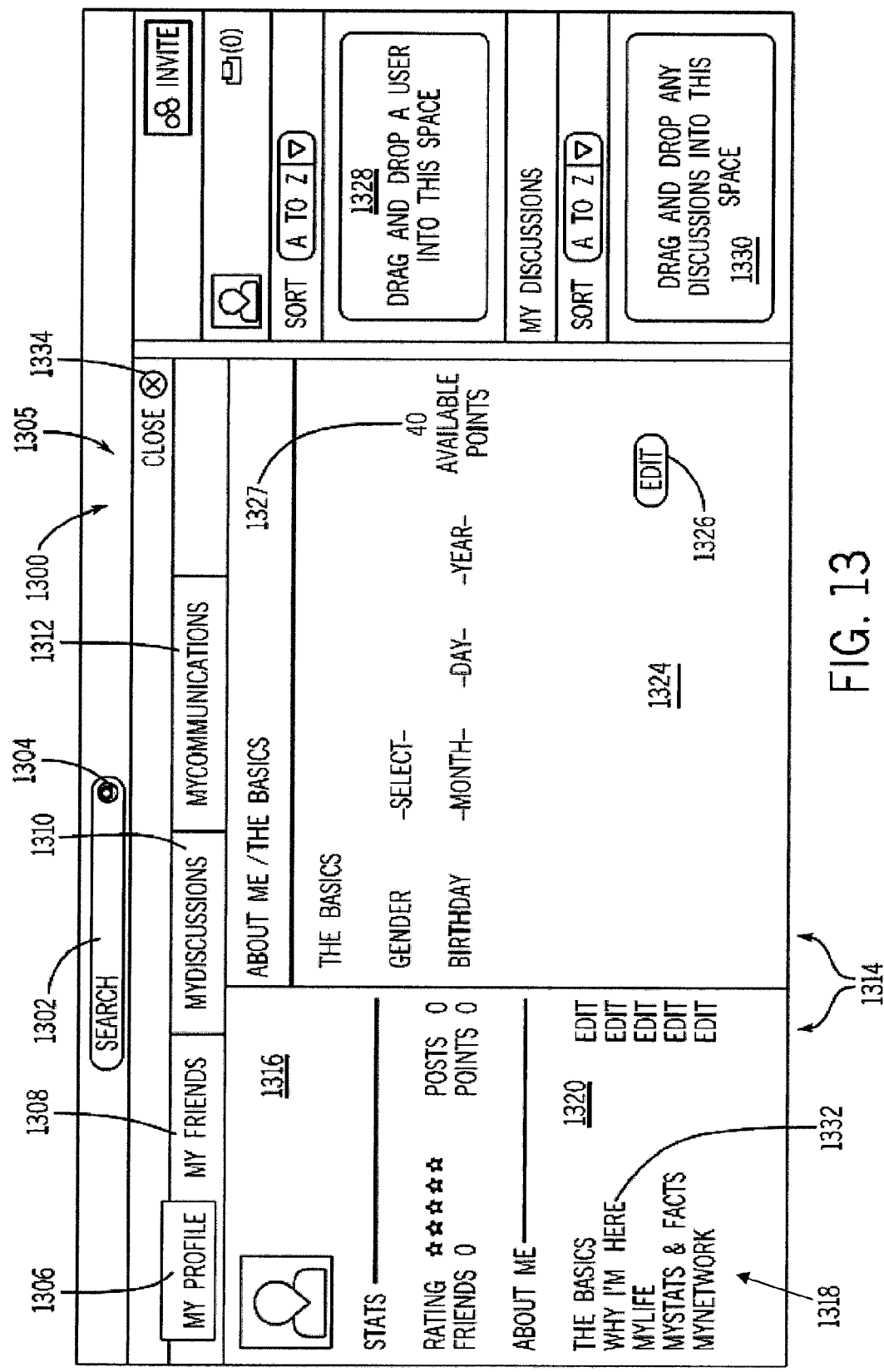
FIG. 13 depicts a user profile user interface of the social network application in accordance with the second exemplary embodiment.
Figure 15:
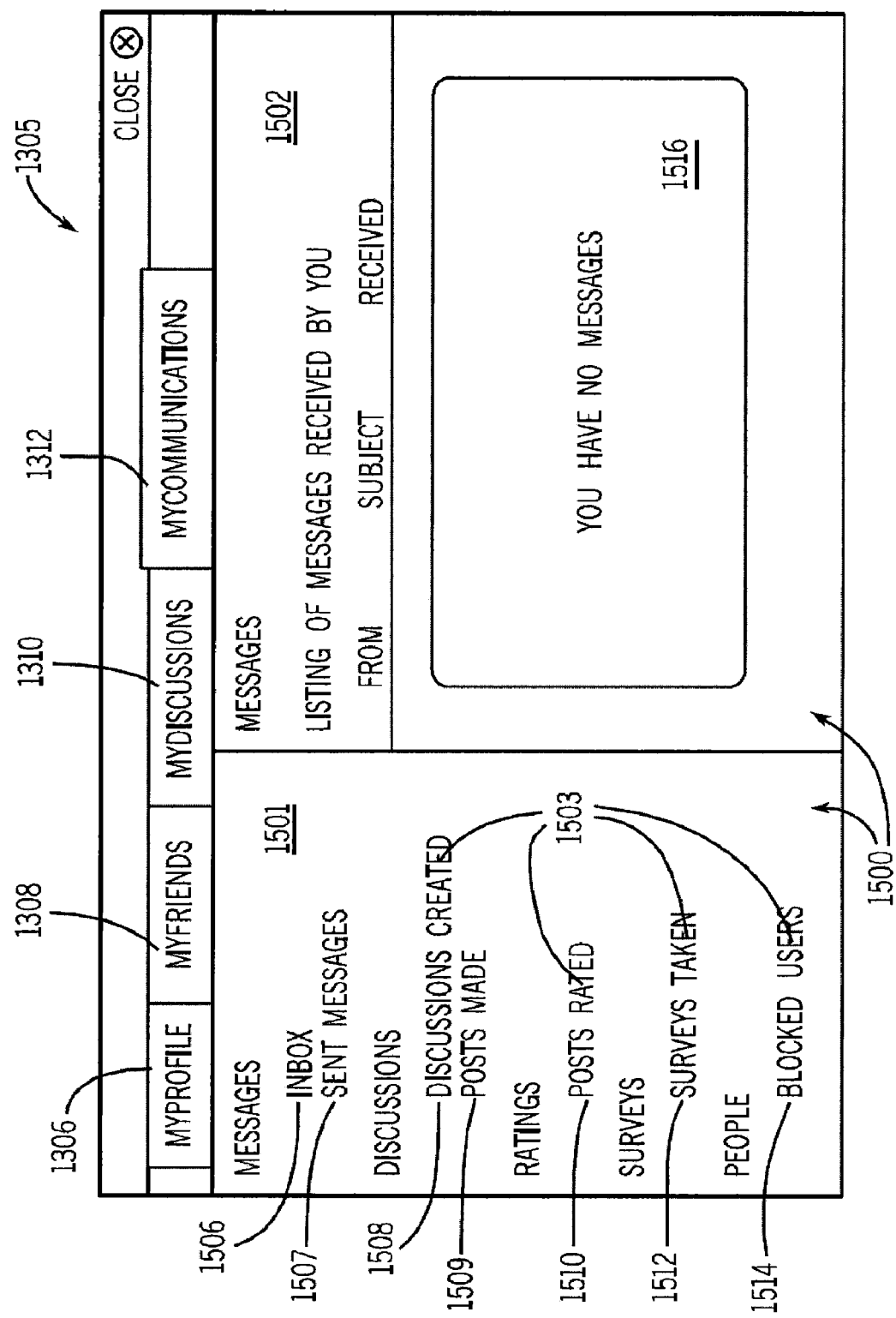
FIG. 15 depicts a communications user interface of the social network application in accordance with the second exemplary embodiment.

With reference to FIG. 13, a user interface 1300 is presented, in an exemplary embodiment, after receiving a user selection of "Create Profile" hyperlink 1202. User interface 1300 may include a search window 1302 and a search button 1304. The user may enter text in search window 1302 and select search button 1304 to conduct a search for the terms entered in search Window 1302 in data items associated with the social network. User interface 1300 also may include user profile window 1305, a friend identification section 1328, and a discussion section 1330. Friend identification section 1328 may present information to the user associated with friends of the user previously identified in the social network and allow the user to invite new friends to join the social network. Discussion section 1330 may present information to the user associated with previous discussions in which the user participated. User selection of a close button 1334 may close user profile window 1305.

User profile window 1305 may include a plurality of tabs. The plurality of tabs may include a first tab 1306, a second tab 1308, a third tab 1310 and a fourth tab 1312. Selection of first tab 1306 may cause presentation of a first tab Window 1314. First tab window 1314 may include a first section 1316 and a second section 1322. The presentation of information in second section 1322 may be controlled by a selection made by the user of an item in first section 1316. Exemplary summary information associated with the user is presented in first section 1316. For example, an image of the user, a user name of the user, a member since date, and statistics associated with the users use of the social network may be presented to the user at user device 104*a* under control of social network application 310 in first section 1316. First section 1316 also may include a plurality of hyperlinks 1318 from which the user at user device 104*a* may make selections. The user selection of a hyperlink of the plurality of hyperlinks 1318 may control the presentation of information in second section 1322. For example, a user selection of a first hyperlink 1320 of the plurality of hyperlinks 1318 may cause presentation of a basic information window 1324 associated with the user profile and an edit button 1326. For a new user, the basic information may be set to default values. For an existing user, basic information window 1324 may present the previously entered user information. The user may be encouraged to enter information into the user profile by awarding a number of points 1327 to the user. A reward may be given to the user after achieving a pre-determined number of points. For example, a gift or cash award may be provided to the user after achieving a predetermined number of points. The user may enter data into the user profile by selecting edit button 1326 which causes presentation of a user profile data entry window under control of social network application 310. Points may be awarded for a variety of reasons. For example, points may be awarded for adding a person to a contact list, creating a topic, completing a profile attribute, contributing to a topic (posting), being active during a week, having post by the user rated by another user, rating another users post, inviting someone to join the social network, someone that the user invited to join the network joining the network, contributing to a topic for the first time, having a threshold number of users who have contributed to a topic reach a new threshold (25, 50, etc.), answering a survey, uploading a profile image, having someone read/view a topic the user created, and registering.

As another example, a user selection of a second hyperlink 1332 of the plurality of hyperlinks 1318 may cause presentation of a "Why I'm Here" information window 1400 in second section 1322 shown with reference to FIG. 14. For a new user, the "Why I'm Here" information may be set to default values. For an existing user, "Why I'm Here" Window 1400 may present the previously entered information. The user may be encouraged to enter information into the user profile by awarding a number of points 1402 to the user. The user may enter data into the user profile by selecting edit button 1404 which causes presentation of a user profile data entry window under control of social network application 310.

Selection of fourth tab 1312 may cause presentation of a second tab window 1500. Second tab window 1500 may include a first section 1501 and a second section 1502. The presentation of information in second section 1502 may be controlled by a selection made by the user of an item in first section 1501. First section 1501 may include, a plurality of hyperlinks 1503 organized under headers from which the user at user device 104a may make selections. For example, the plurality of hyperlinks 1503 may include an "Inbox" hyperlink 1506, a "Sent Message" hyperlink 1507, a "Discussions Created" hyperlink 1508, a "Posts Made" hyperlink 1509, a "Posts Rated" hyperlink 1510, a "Surveys Taken" hyperlink 1512, and a "Blocked Users" hyperlink 1514. For example, a user selection of first hyperlink 1506 may cause presentation of a message window 1516 including messages received by the user from other users of the social network.

Figure 16:
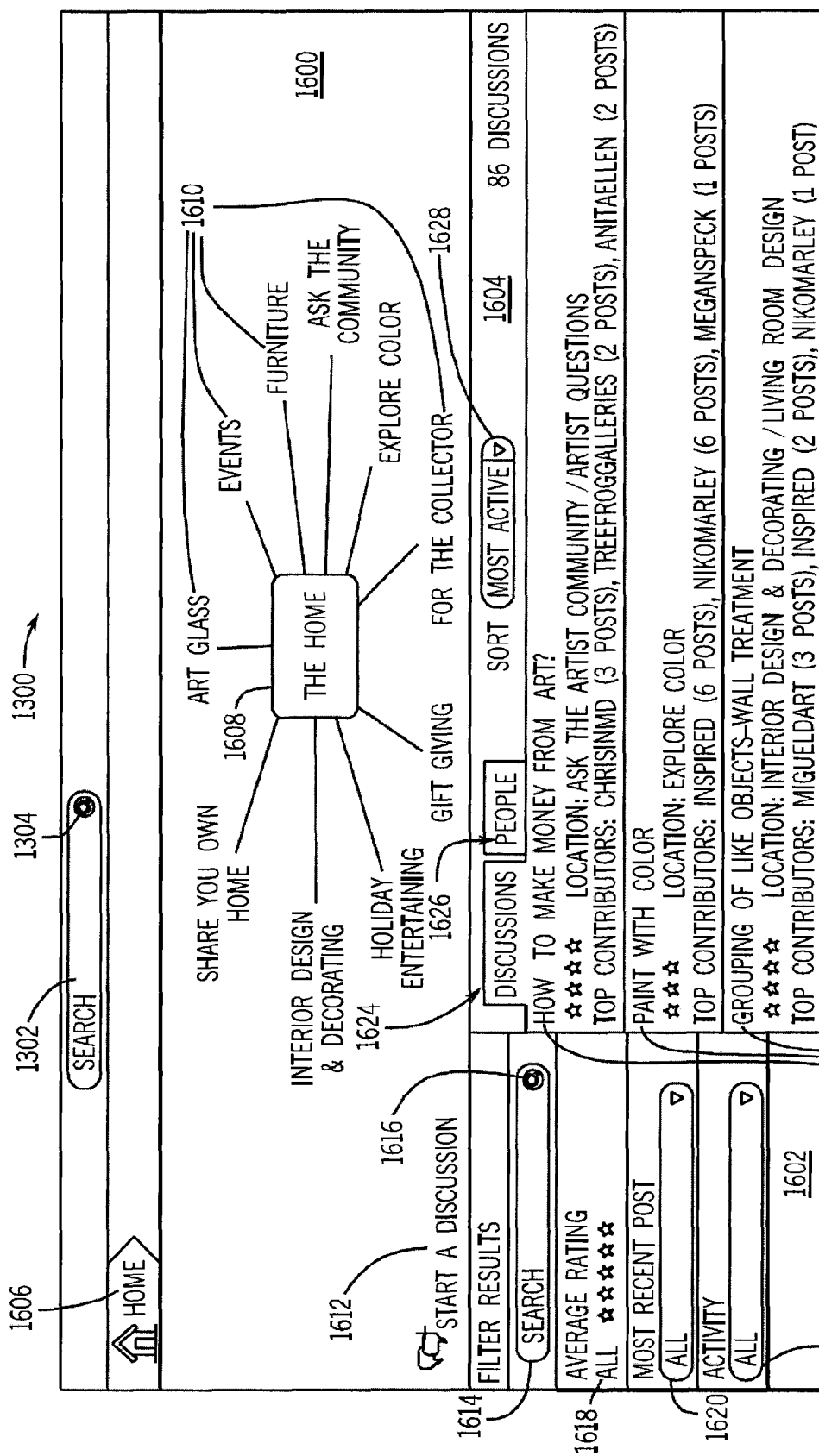
FIG. 16 depicts a discussions tab user interface of the social network application in accordance with the second exemplary embodiment.

With reference to FIG. 16, user interface 1300 is presented, in an exemplary embodiment, after receiving a user selection of close button 1334 and includes a community taxonomy window 1600, a filter section 1602, and an information window 1604. Community taxonomy window 1600 may include a taxonomy level indicator 1606, a taxonomy hub 1608, a plurality of taxonomy spokes 1610, and a "Start Discussion" button 1612. Taxonomy level indicator 1606 indicates the level in the taxonomy currently presented as taxonomy hub 1608 presented at the center of the plurality of taxonomy spokes 1610. The plurality of taxonomy spokes 1610 include specific topics associated with taxonomy hub 1608. User selection of "Start Discussion" button 1612 allows the user to start a discussion with the social network. The discussion may be associated with taxonomy hub 1608. The taxonomy may be static or dynamic. A static taxonomy is pre-defined based on the community associated with the social network. A dynamic taxonomy can create new taxonomy spokes 1610 automatically based on community interaction with social network application 310.

Filter section 1602 may include controls that allow the user to filter information presented in information window 1604. For example, filter section 1602 may, include a search window 1614, a search button 1616, a rating filter control 1618, a timing filter control 1620, and an activity filter control 1622. The user may enter text in search window 1614 and select search button 1616 to conduct a search for the terms entered in search window 1614. Search results associated with discussions or people in the social network may be presented in information, window 1604. Information window 1604 may include a discussion tab window 1624, a people tab window 1626, and a sort button 1628. Discussion tab window 1624 may include a list of discussion hyperlinks 1630 based on any filter control selections selected by the user in filter section 1602. Selection of a discussion hyperlink from the list of discussion hyperlinks 1630 may cause presentation of the discussion as a series of user comments in a conversation. Associated with each discussion hyperlink may be a rating, a taxonomy level location, and top contributors to the discussion by user name and number of posts to the discussion.

Figure 17:
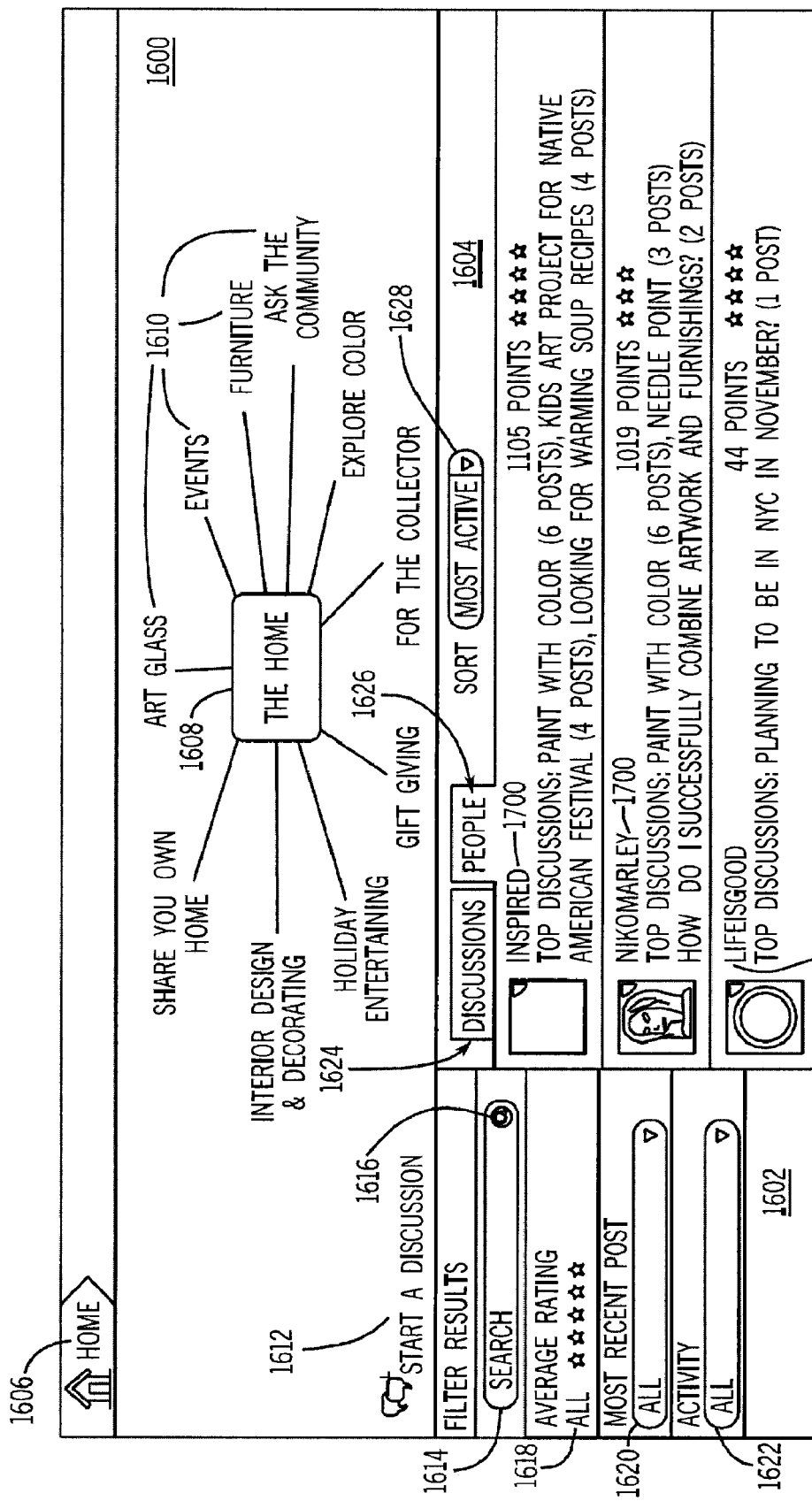
FIG. 17 depicts a people tab user interface of the social network application in accordance with the second exemplary embodiment.

With reference to FIG. 17, people tab window 1626 may include a list of people hyperlinks 1700 based on any filter control selections selected by the user in filter section 1602. Selection of a people hyperlink from the list of people hyperlinks 1700 may cause presentation of user profile information associated with the user. Associated with each people hyperlink may be a user name, user image, user number of points earned, a rating, and top discussions by subject and number of posts to the discussion.

Figure 18:
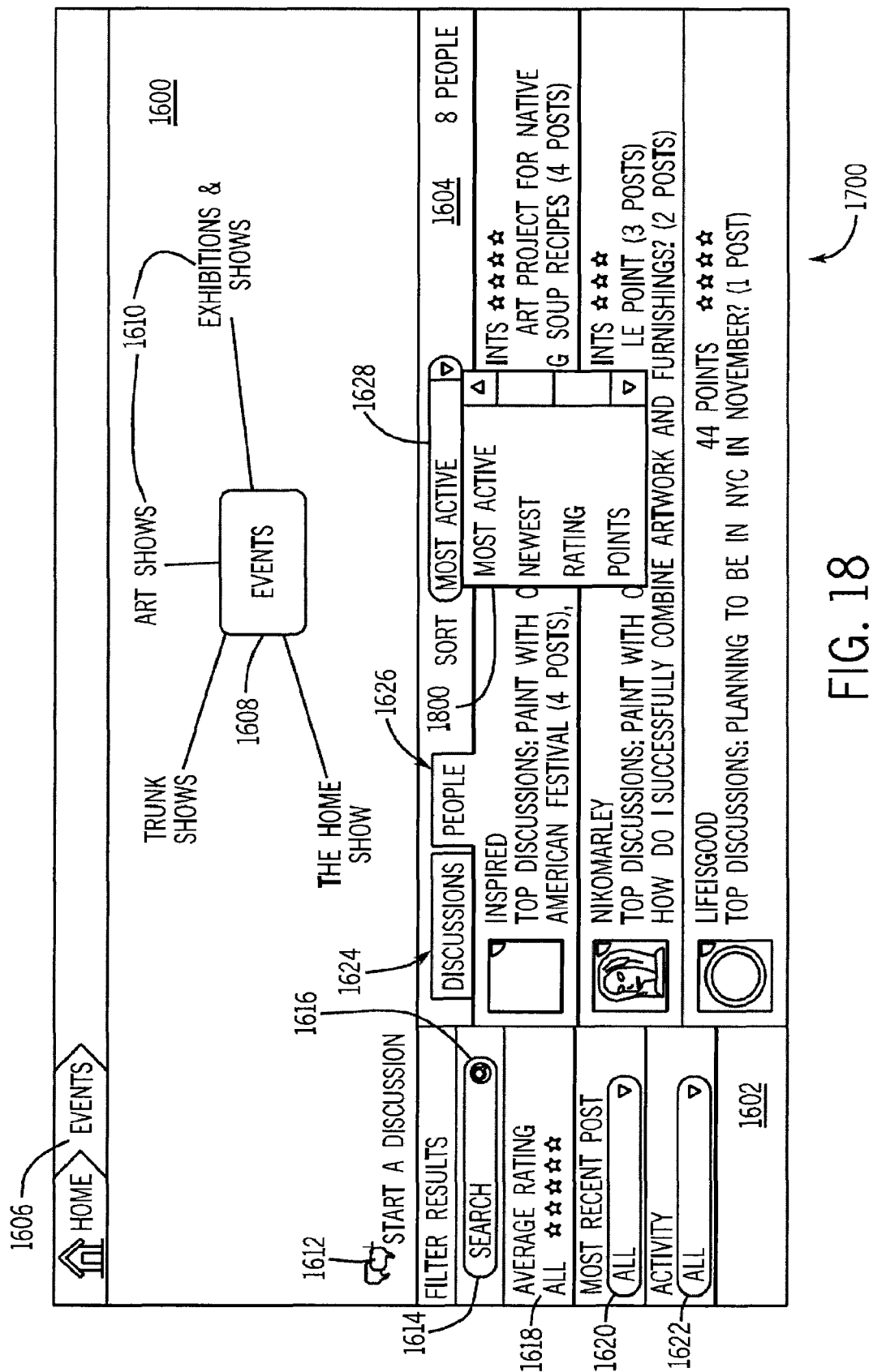
FIG. 18 depicts a sorting menu of the people tab user interface of FIG. 17 of the social network application in accordance with the second exemplary embodiment.

With reference to FIG. 18, a second level of the community taxonomy is shown in community taxonomy window 1600 after user selection of a spoke of the plurality of taxonomy spokes 1610. Taxonomy level indicator 1606 is updated to indicate the taxonomy level. In the exemplary embodiment of FIG. 18, sort selector 1628 includes a plurality of sort options which are selectable by the user from a drop down menu 1800. The plurality of sort options may vary based on whether discussion tab window 1624 or people tab window 1626 is selected. Exemplary sort selections associated with people tab window 1626 may include most active, newest, rating, points, etc.

Figure 19A:
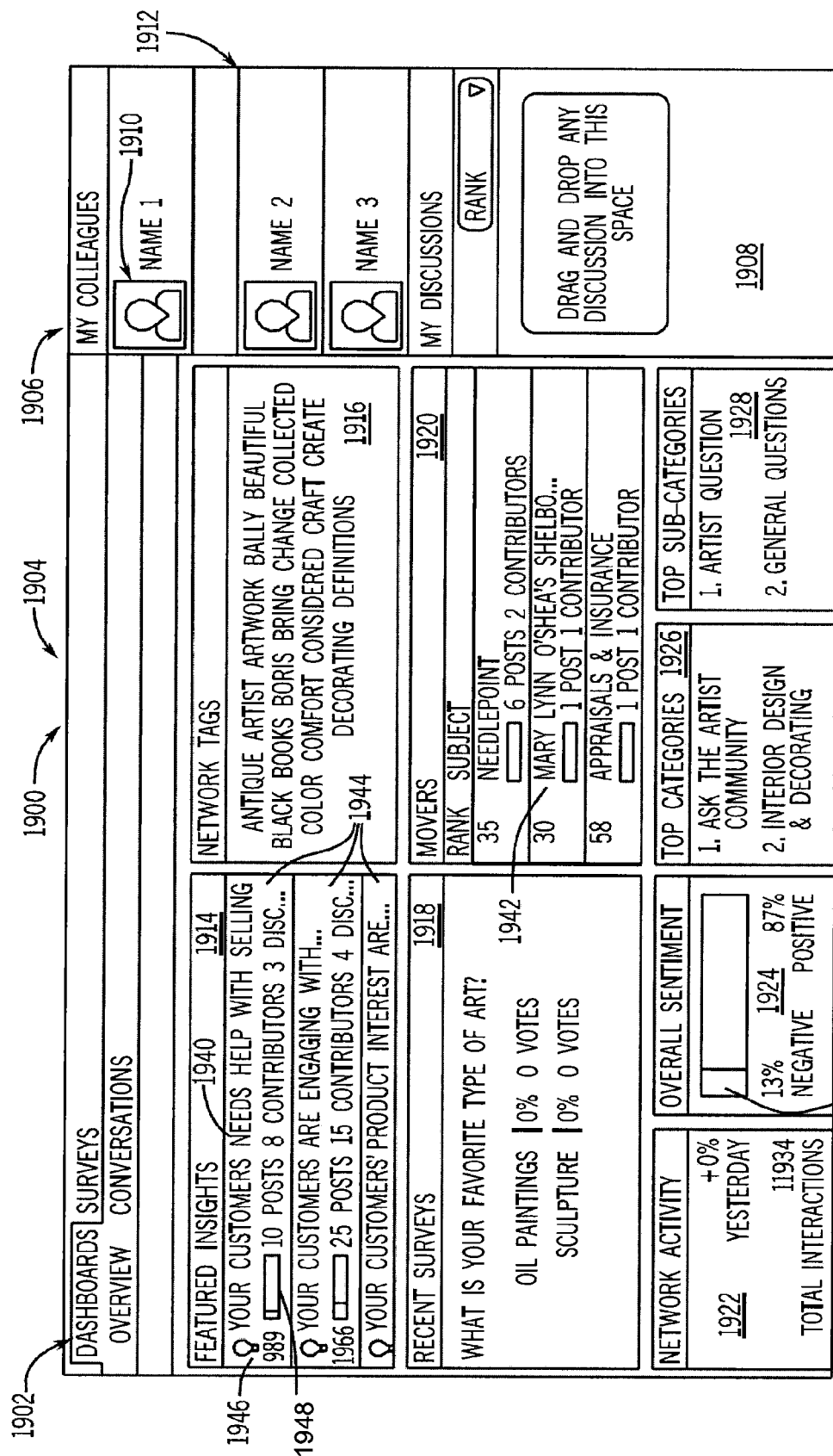
FIGS. 19a-19b depict a user interface of an interaction processing and reporting application in accordance with a second exemplary embodiment.
Figure 19B:
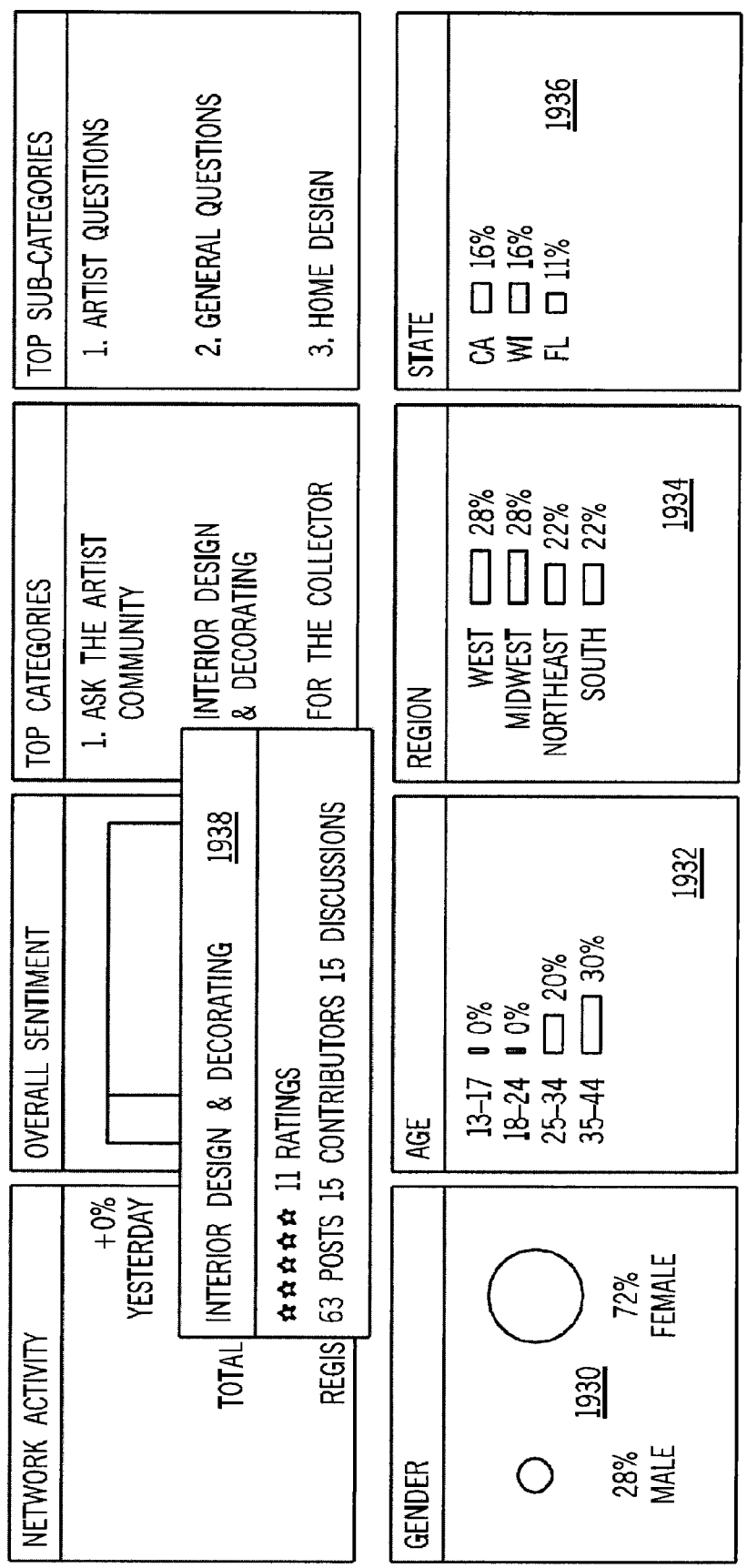

With reference to FIGS. 19a and 19b, a user interface 1900 of interaction processing/reporting application 312 is shown in accordance with a second exemplary embodiment. User interface 1900 may be presented in browser application 210 at user device 104a or server 108, for example, after receiving an indicator indicating user selection of a hyperlink in a web page or user entry of a hyperlink in browser application 210. In response to receiving the indicator, a user may be prompted to login to interaction processing/reporting application 312. User interface 1900 may include a dashboard tab window 1902, a survey tab window 1904, a colleagues section 1906, and a discussions section 1908. Colleagues section 1906 includes a first list of colleagues 1910 currently accessing interaction processing/reporting application 312 and a second list of colleagues 1912 not currently accessing interaction processing/reporting application 312.

In the exemplary embodiment of FIGS. 19a and 19b, dashboard tab window 1902 includes an insight window 1914, a network tag window 1916, a survey window 1918, a movers window 1920, a network activity Window 1922, an overall sentiment window 1924, a top taxonomy category window 1926, a top taxonomy spoke window 1928, a gender window 1930, an age window 1932, a region window 1934, and a state window 1936. With reference to FIG. 19b, an information window 1938 is presented to the user of interaction processing/reporting application 312, for example, as the user scrolls a mouse over overall sentiment window 1924. FIGS. 19a, 19b, 20a, 20b, and 21-24 present characteristic information associated with use of the website based on an analysis of user profiles and/or user comments. Characteristic information may be determined indicating a topic of user comments, an insight identified from the user comments, a sentiment value for a topic and/or a user, an engagement value for a topic and/or an insight, an influence value for a user, an interaction value for a topic and/or an insight, and a website activity level. Characteristic information may be presented to a user using output interface 200, 314. For example, indicators of the characteristic information may be presented using a display, may be printed out for review using a printer, and/or may be stored in database 110, 120 for processing.

A topic identifies a subject of one or more user comments and/or discussions. An "insight" can be focused on a number of different areas, including but not limited to, customer needs and/or issues, competition, conversational buzz, brand, products, loyalty, etc. The insight is derived from the millions of conversations and interactions that occur in the community associated with the social network. An insight can be made up of any number of user comments, topics, user profile attributes, etc. The insight represents the grouping of data based on the interactions, sentiment, and content of the user comments created by the user. User comments from one or more topic can make, up a single insight. Categories and subcategories are used to define the contextual taxonomy by which discussions are classified. Categories and subcategories can be created by users.

Insight window 1914 includes a scroll down list of hyperlinks 1944 to one or more topics that have been identified as providing information of interest to the entity associated with the website. The list of hyperlinks 1944 include insight indicators. For each insight, insight window 1914 may include a subject identifier created based on the topic of the discussion(s) associated with the insight, an interaction value 1946, a sentiment indicator 1948, a number of posts associated with the insight, a number of contributors to the insight, and a number of discussions associated with the insight.

A topic may be determined by extracting meaningful information from text derived from the discussions. Raw text is pre-processed though a series formatting and cleansing steps to improve the syntactic and grammatical characteristics of the user comments. The user comments are analyzed with respect to the syntactic functions of the constituents and the lexical meaning of the word tokens. Tokens that meet a removal criterion are eliminated from the text of the user comments. For example, tokens may be removed based on a stop word lists as well as a part of speech tag associated with the token. As an example, possessive pronouns may be identified and removed. In an exemplary embodiment, noun phrases are identified from the processed text of the user comments and scored as to the probability that the noun phrases provide meaningful information about the topic being discussed. Noun phrases are first ranked against a multi-domain set, of unigrams, bigrams, and trigrams obtained using an unsupervised extraction algorithm. A phrase is scored according to the joint probability of the phrase belonging to multiple domains. The top N phrases are eliminated from the set. The remaining phrases are evaluated by a supervised learner trained against a feature set built to provide a relevance score. The features, used may include, but are not limited to, term frequency, number of words in the phrase, word position within the sentence, the part of speech tag of the word(s), the length of the word(s), and various boolean syntactic features of the words as well as a semantic relatedness score between the main words of the phrase and the topic being analyzed. Noun phrases identified as meaningful are mapped to higher level concepts using a concept dictionary and used to build a concept-based catalog of topics being discussed in the social network. For example, noun phrases may be mapped to higher level concepts using a semantic network knowledge base constructed by linking elements together using a series of "is-a" type relationships.

Network tag window 1916 presents a tag cloud associated with the discussions associated with the website. Tag clouds can be associated with users, with discussions, etc. A tag cloud is designed to represent what people are talking about in the social network. Tag clouds may be associated with users and topics via user comments posted as part of a discussion or to initiate a discussion. For any given user comment, all words in the post may be evaluated. In an exemplary embodiment, the verbs and nouns are stored in a common root form in the tag cloud. The words of the user comment are divided into sentences using common delimiters such as periods, question marks, exclamation points, etc. A part of speech (POS) may be identified for the words of the sentence. For example, nouns and verbs may be isolated from each sentence and converted to root form. Root forms of the noun or verb may be formed by removing plurals, past tense, gerunds, etc. For example, both "cat" and "cats" are stored as NOUN "cat"; "running", "ran", and "run" are stored as VERB "run"; etc. In an exemplary embodiment, the JMonty Part of Speech tagger is used to isolate the nouns and verbs, in each sentence. In an exemplary embodiment, the MIT Java Interface to WordNet (JWI) is used to convert the words to root form.

The root forms may be stored in a database such as database 110 or database 120 associated with a user or a topic. As more occurrences of the same word are found, the word is given additional weight. For example:

| Word | POS  | Weight | User ID |
|------|------|--------|---------|
| cat  | NOUN | 2      | 1       |
| run  | VERB | 4      | 1       |
| dog  | NOUN | 1      | 1       |

Tag clouds may be used for searching. For example, if a user enters the search term "dog" in search window 1302, the search process scans the tag clouds of topics for occurrences of the term "dog". Topics are returned and presented to the user possibly sorted by the relative weight of the word "dog" in each topic's tag cloud. A synonym of the search term may be included in the search. For example, the synonym may be identified using a dictionary. In an exemplary embodiment, only closely related synonyms of the search term entered by the user may be used. For example, if a user does a search on "dog", the search process may scan the tag clouds of topics for occurrences of "puppy", "hound", etc. in addition to "dog".

Tag clouds also may be used to identify users, products, and topics that may be of interest to social network users. The tag clouds of a user is compared to the tag clouds of other users, product, and topics. When a user tag cloud has a high occurrence (based on weight) of the same words as a product, topic, or other user, they can receive introductions or suggestions to introduce users to other users and to content that they may not have found on their own.

Overall sentiment window 1924 presents a sentiment indicator 1950 associated with the discussions associated with the website. The sentiment indicator may be depicted using other mechanisms. Whereas a tag cloud is designed to indicate what people are talking about, sentiment is designed to indicate how users feel about what they're talking about. Sentiment is also associated with users and topics based on analysis of the user comments. For any given user comment, the sentiment is evaluated on a sentence-by-sentence basis. A comment's sentiment score is the sum of the scores of its individual sentences. At a fundamental level, each "positive" word in a sentence is scored +1 point and each negative word is scored −1 point. The score of the sentence is the sum of the points. Relative sentiment, i.e. strongly positive, somewhat negative, neutral, is measured as distance from zero. Thus, in an exemplary embodiment, a sentence with a score of +2, is less positive than one with a score of +3, but both sentences reflect a positive sentiment.

The POS of each word of the sentence is determined. In an exemplary embodiment, the adverbs and adjectives are isolated from the sentence. The adverbs and adjectives are reduced to their root form. The root words are compared to a list of known positive words and known negative words which may be stored in a computer-readable medium, database 110, database 120 etc. If the root word is found in the positive or negative list, the word may be scored +1 or −1. If the root word is not found, synonyms of the root word are identified. If a synonym is found in the positive or negative list, the word is scored +0.5 or −0.5. Evaluating the user comment on a sentence-by-sentence basis, instead of using the composite of all words in the user comment allows "negating" of positive or negative words as appropriate. For example, consider the following sentences:

a) I am happy about this.
  b) I am not happy about this.
  c) I am unhappy about this.
  d) I am not unhappy about this.

In a straight word-counting process, the scores would be:

a) +1 (positive sentiment)
  b) +1 (positive sentiment, which is inaccurate)
  c) −1 (negative sentiment)
  d) −1 (negative sentiment, which is inaccurate)

Evaluating based on the sentence, allows us to determine that the negator word "not" occurs in sentence B in conjunction with a positive feeling word. In such a case, the sentiment score is multiplied by −1 for each "negator" word it finds in a sentence. Using this technique, the scores of the sentences are as follows:

a) +1 (positive sentiment)
  b) −1 (negative sentiment, which is accurate)
  c) −1 (negative-sentiment)
  d) +1 (positive sentiment, which is accurate).

The known negator words also may be stored in a computer-readable medium, database 110, database 120, etc. Sentiment scores for a user or topic are the sum of the sentiment of the user comments associated with the user or topic with relative positive or negative scores depicted as distance from zero.

With reference to FIG. 20a, an insight window 2000 is presented after user selection of an insight hyperlink 1940 in accordance with an exemplary embodiment. Insight window 2000 may include an insight header 2002, a close button 2004, an insight details section 2006, and a discussion details section 2008. Insight header 2002 presents information associated with the insight. User selection of close button 2004 closes insight window 2000. Insight details section 2006 provides detailed information associated with the insight selected. For example, insight details section 2006 may include a statistics tab window 2010 and a filter settings tab window 2012. Statistics tab window 2010 may present statistical information related to the selected insight. For example, statistics tab window 2010 may include an interaction indicator 2016, a community rating statistic, an insight sentiment indicator 2016, a number of insight user-comments (posts), a number of insight contributors, a number of insight discussions, an age statistic, gender statistic, a location statistic, etc. associated with users involved in the discussions associated with developing the insight. Discussion details section 2008 includes a sort selector 2014 and a discussion list 2016 of one or more discussion hyperlinks associated with the insight. Use of sort selector 2014 allows the user to sort discussion list 2016. Associated with, each discussion hyperlink may be a sentiment indicator, a subject, a rating, a taxonomy level indicator, a number of user comments, a number of contributors, and a last post date/time.

With reference to FIG. 20b, filter settings tab window 2012 may include a plurality of filter settings which can be used by the user to identify insights having specified characteristics. Filter settings tab window 2012 may include the filter settings that identified the insight presented to the user. The filter parameters include for example characteristics that are included in a user profile to allow a determination of characteristic information associated with use of the website based on the user profiles and user comments.

Figure 21:
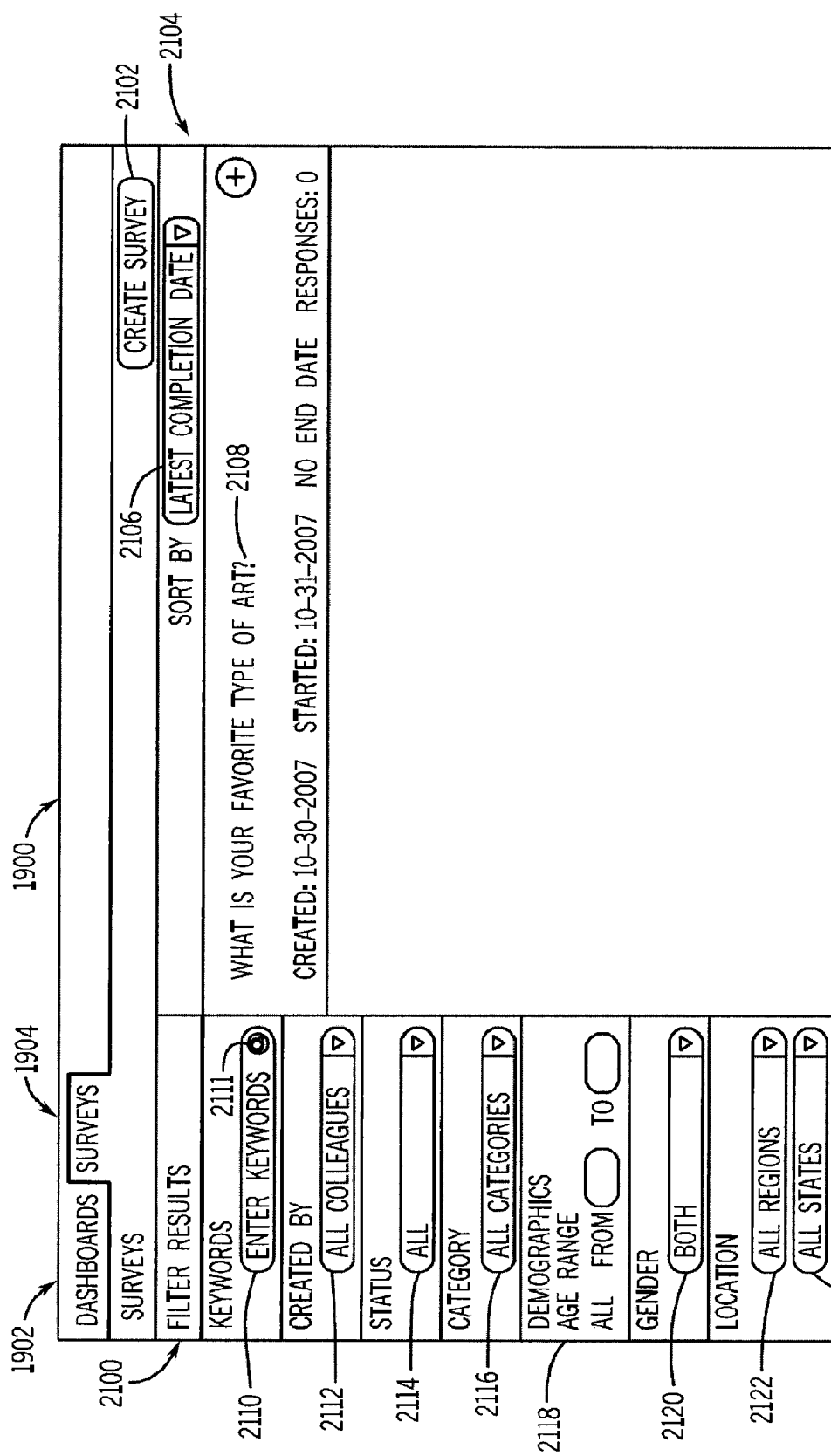

With reference to FIG. 21, survey tab Window 1904 is presented, in accordance with an exemplary embodiment, after user selection of the tab associated with survey tab window 1904. Survey tab Window 1904 includes a filter section 2100, a "Create Survey" button 2102, and a survey presentation section 2104. User selection of "Create Survey" button 2102 causes presentation of a data entry-window which allows the user to define a survey. Survey presentation section 2104 includes a sort-selector 2106 and a survey list 2108 of one or more survey hyperlinks. Use of sort selector 2106 allows the user to sort survey list 2108 based on a variety of parameters including a latest completion date. Associated with each survey hyperlink may be a question associated with the survey, a creation date, a survey initiation date, a survey completion date, and a number of responses.

Filter section 2100 may include controls that allow the user to filter information presented in survey presentation section 2104. For example, filter section 2100 may include a keyword search window 2110, a search button 2111, a "Created By" control 2112, a status control 2114, a category control 2116, a demographic control 2118, a gender control 2120, a region control 2122, and a state control 2124. The user may enter text in keyword search window 2110 and select search button 2111 to conduct a search for the terms entered in search window 2110. Search results associated with surveys conducted in the social network may be presented in survey presentation section 2104.

With reference to FIG. 22, a mover window 2200 is presented after user selection of a mover hyperlink 1942 in accordance with an exemplary embodiment. Mover window 2200 may include a mover identifier 2202, a close button 2204, an insight details section 2206, and a discussion details section 2208. Insight header 2202 presents information associated with the insight associated with the user identified as a "mover". A mover is defined as a topic that has high levels of interaction within a defined time period. An example time period may be the last 24 hours though this time period is not intended to be limiting. For example, if a discussion about the latest mobile phone release has many users complaining and providing commentary, reading, and rating related to that topic of discussion, the topic of "latest mobile phone release" would become a mover. The topic could have existed for many months, however, the fact that the interaction levels have increased rapidly cause it to be, identified as a mover. User selection of close button 2204 closes mover window 2200. Insight details section 2206 provides detailed information associated with the insight of the "mover" selected. For example, insight details section 2206 may include a statistics tab window 2210 and a filter settings-tab window 2212. Statistics tab window 2210 may present statistical information related to the selected insight. For example, statistics tab Window 2210 may include an interaction indicator, a community rating statistic, a sentiment indicator, a number of user comment, a number contributors to the discussion, an age statistic, a gender statistic, a location statistic, etc. associated with users involved in the discussions associated with developing the insight. Discussion details section 2208 includes a sort selector 2214 and a user comment list 2216 of one or more user comments associated with the discussion. Use of sort selector 2214 allows the user to sort user comment list 2216. Associated with each user comment may be an age of the user making the comment, an image of the user making the comment, a sentiment indicator associated with the comment, a snippet of the comment, a rating for the comment, a user name of the user making the comment, a posting date/time, etc. The complete comment can be presented to the user of interaction processing/reporting application 312 by selecting an expand button 2218.

Figure 23:
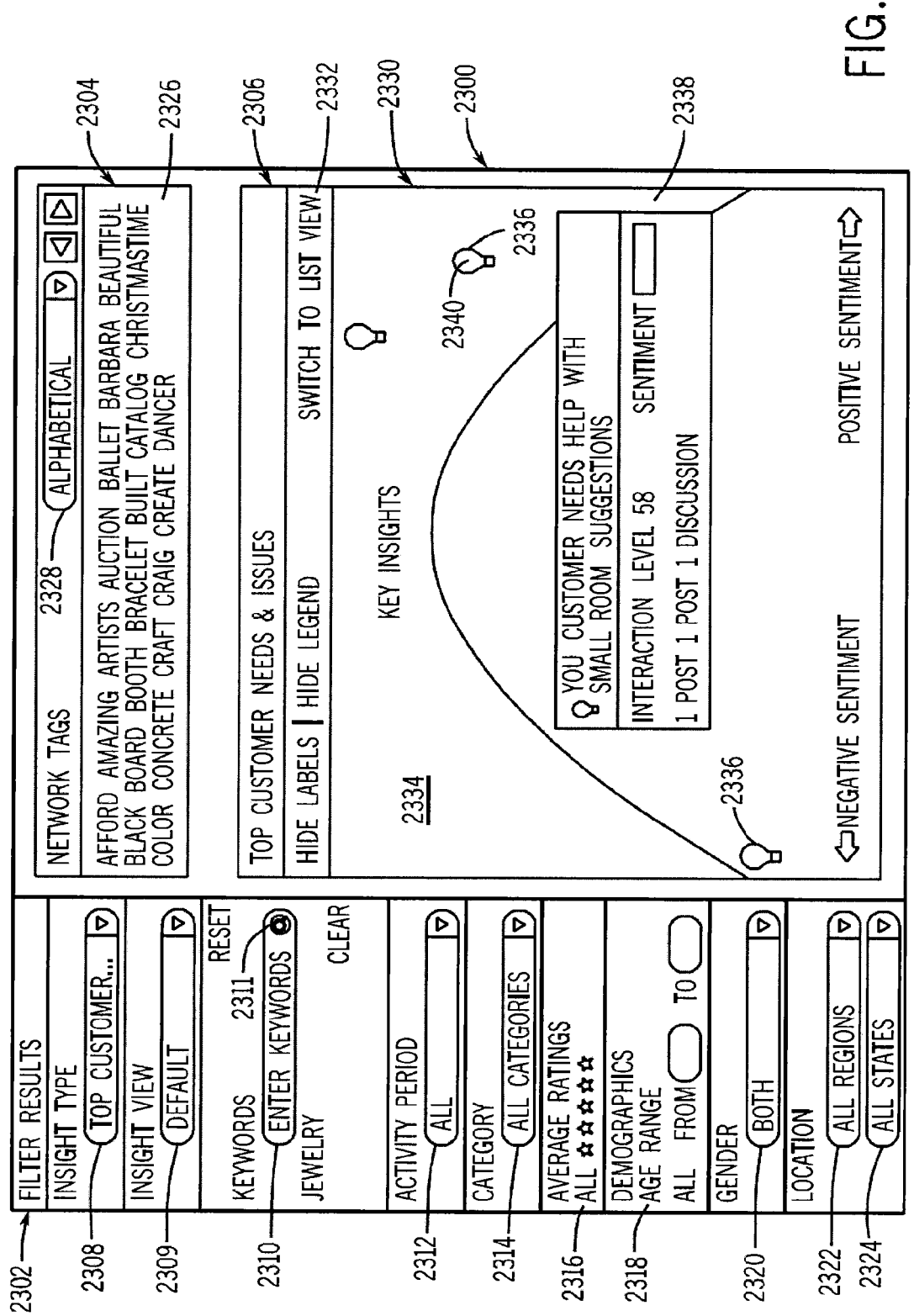

With reference to FIG. 23, an insight Window 2300 is presented, in accordance with an exemplary embodiment, after user-selection of network tag window 1916. Insight window 2300 may include, a filter section 2302, a network tag section 2304, and a insight summary section 2306. Filter section 2302 may include controls that allow the user to filter information presented in insight summary section 2306. For example, filter section 2302, may include an "Insight Type" selector 2308, an "Insight View" selector 2309, a keyword search window 2310, a search button 2311, an "Activity Period" selector 2312, a category selector 2314, a rating control 2316, a demographic control 2318, a gender selector 2320, a region selector 2322, and a state selector 2324. The user may enter text in keyword search window 2310 and select search button 2311 to conduct a search for the terms entered in search window 2310 for example using the tag clouds. Search results associated with insights obtained from monitoring of the social network may be presented in insight summary section 2306.

Network tag section 2304 includes a tag cloud. The tag-cloud may be associated with all discussions associated with the website. Using filter section 2302, the tag cloud may be modified based on the filter criteria selected using the filter parameters 2308, 2309, 2312, 2314, 2316, 2318, 2320, 2322, 2324. The tag cloud also may be modified based on the search term entered in keyword search window 2310.

Insight summary section 2306 includes a summary presentation section 2330 and a view selector 2332. Use of view selector 2332 allows the user to switch the method of presentation of the insights in summary presentation section 2330. For example, view selector 2332 may switch between a graphical view and a list view. With reference to FIG. 23, a graphical view of the insights is presented in summary presentation section 2330. In an exemplary embodiment, the graphical view of the insights shown in summary presentation section 2330 includes a graph 2334 and a plurality of insight indicators 2336. The horizontal axis of graph 2334 indicates a sentiment value associated with the insight and may be centered at zero with positive sentiment indicated to the right and negative sentiment to the left. The vertical axis of graph 2334 indicates an engagement value associated with the insight. In another exemplary embodiment, vertical axis of graph 2334 may indicate an interaction value and/or an influence value. A predefined threshold may be used as the minimum engagement value shown on graph 2334. The plurality of insight indicators 2336 are indicated on graph 2334 based on the sentiment value and the engagement value associated with the insight. User selection of an insight indicator may cause presentation of the insight information as discussed with reference to FIGS. 20a and 20b. In an exemplary embodiment, as a user scrolls an input interface device such as a mouse over an insight indicator, an insight summary window 2338 is presented to the user. Insight summary window 2338 may include a topic of the insight, an interaction value, a sentiment indicator, a number of user comments, a number of contributors, and a number of discussions. An insight indicator of the plurality of insight indicators 2336 also may indicate whether or not a sentiment of the topic is changing quickly due to a large number of recent user comments and/or is trending negative or positive or generally remaining the same.

Figure 24:
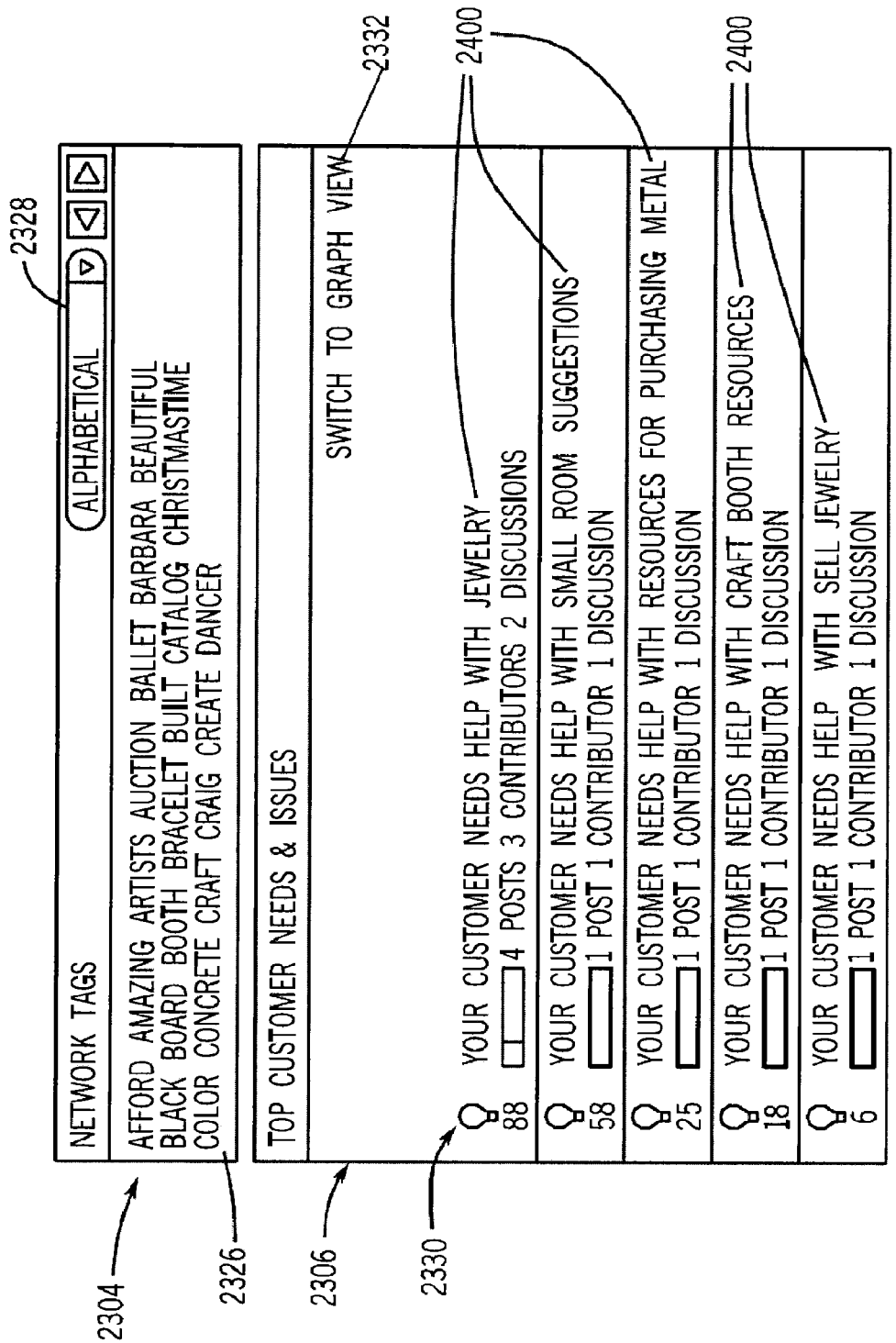
FIG. 24 depicts a seventh user interface of the interaction processing and reporting application in accordance with the second exemplary embodiment, wherein the seventh, user interface is generated after selection of an item from the user interface of FIG. 23.

With reference to FIG. 24, a list view of the insights is presented in summary presentation section 2330. The list view includes a list 2400 of insights. The list 2400 includes discussion hyperlinks. The list 2400 includes all discussions or discussions selected based on the filter criteria and/or the search term entered in keyword search window 2310. Associated with each discussion hyperlink may be a sentiment indicator, a subject, a rating, a taxonomy level indicator, a number of user comments, a number of contributors, and a last post date/time.

A variety of algorithms may be used to determine the characteristic information associated with use of the website based on an analysis of user profiles and/or user comments. In an exemplary embodiment, values can be calculated for interactions with the website including but not limited to, a daily interaction score for a user comment, an overall daily interaction score for user comments, a topic interaction score, and a user interaction score. For example, the daily interaction score for a user comment can be calculated based on the number of times a user comment is viewed and/or the number of times the user comment is rated by another user. The overall daily interaction score for user comments can be calculated by summing the daily interaction scores. The topic interaction score can be calculated by summing the interaction scores associated with user comments identified as being associated with a specific topic. The user interaction score can be calculated based on the number of user comments made by a user, a number of other user comments rated by the user, a number of bookmarks added by the user, a number of topics created by the user, a number if invitations sent to others to join the social network and/or to view the website, a number of messages sent by the user, a number of other user comments read by the user, and/or the number of topics viewed by the user.

In an exemplary embodiment, values can be calculated for influence related to a topic identified from the interactions with the website including but not limited to, a daily topic influence score for a user, an overall daily topic influence score for the user, and an overall topic influence score. For example, the daily topic influence score for a user can be calculated as a sum of the number of user comments made by a user, the number of other user comments rated by the user, and/or the number of user comments made by the user and rated by another user multiplied by an average rating associated with the user comments made by the user. The overall daily topic influence score for the user can be calculated by summing the daily topic influence score for a user for each topic for which the user provided a user comment. The overall topic influence score can be calculated by, summing the overall daily topic influence score for the user with the number of invitations sent by the user that are accepted, the number of other users who have the user in their friends list, the number of messages received by the user, the number of times the user profile of the user is viewed, and/or the number of times a topic created by the user is bookmarked by another user.

In an exemplary embodiment, values can be calculated for engagement related to a topic or an insight identified from the interactions with the website including but not limited to, a topic engagement score and an insight engagement score. For example, the topic engagement score can be calculated by summing the overall daily interaction score for user comments associated with the topic with the average overall daily topic influence score for the users providing user comments associated with a topic. The insight engagement score can be calculated by summing the topic engagement, scores associated with the insight.

In an exemplary embodiment, values can be calculated for a user including but not limited to, a daily influence score for the user, a topic influence score for the user, and a total influence score for the user. For example, the daily influence score for the user can be calculated by summing the number of user comments made by the user that day, the number of other user comments rated by the user that day, and/or the number of user comments made by the user and rated by another user that day multiplied by an average rating associated with the user comments made by the user that day. This value may be added to the number of invitations sent by the user that are accepted that day, the number of messages received by the user that day, the number of times the user profile of the user is viewed that day, and/or the number of times a topic created by the user is bookmarked by another user that day. The topic influence score for the user can be calculated as a sum of the number of user comments made by the user, the number of other user comments rated by the user, and/or the number of user comments made by the user and rated by another user multiplied by an average rating associated with the user comments made by the user. The total influence score for the user can be calculated as a sum of the user's daily influence scores and the number of other users who have the user in their friends list.

In an exemplary embodiment, values can be calculated for a discussion made up of a series of user comments including but not, limited to, an overall interaction score for the discussion and an overall engagement score for the discussion. For example, the overall interaction score for the discussion can be calculated by summing the interaction score for each user comment associated with the discussion. The overall engagement score for the discussion can be calculated by multiplying the average interaction score for each user comment by the average influence score per user comment and/or by the number of unique users providing a user comment to the discussion.

In an exemplary embodiment values can be calculated for a category including but not limited to, an overall interaction score for the category and an overall engagement score for the category. For example, the overall interaction score for the category can be calculated by summing the interaction score for each user comment associated with the discussions included in the category. The overall engagement score for the category can be calculated by summing the engagement score for each user comment associated with the discussions included in the category.

In an exemplary embodiment, values can be calculated for an insight made up of a series of user comments including but not limited to, an overall interaction score for the insight and an overall engagement score for the insight. For example, the overall interaction score for the insight can be calculated by summing the interaction score for each user comment associated with the insight. The overall engagement score for the insight can be calculated by multiplying the average interaction score for each user comment by the average influence score per user multiplied and/or by the number of unique users providing a user comment to the insight.

In an exemplary embodiment, values can be calculated for daily use of the social network including but not limited to, a daily user comment interaction score, a daily user interaction score, an overall daily network interaction score, a daily influence score, and a daily engagement score. For example, the daily user comment interaction score can be calculated by summing the daily interaction score for each user comment posted to the website that day. The daily user interaction score can be calculated by summing the daily user interaction score for each user using the website that day. The overall daily network interaction score can be calculated by summing the daily user comment interaction score with the daily user interaction score. The daily influence score can be calculated by summing the daily user influence score for each user using the website that day. The daily engagement score can be calculated by combining an interaction measure with an influence measure. For example, daily engagement score can be calculated by multiplying the interaction measure and the influence measure. The interaction measure may be calculated as the sum of the daily interaction score for each user comment posted to the website that day divided by the number of active users of the website. The number of active users of the website may be determined as the number of people who caused an interaction. The influence measure may be calculated as the sum of the daily influence score for each user comment posted to the website that day divided by the number of active influencers of the website. The number of active influencers of the website may be determined as the number of people who have an influence score for the day.

The characteristic information, of course, can be calculated over different periods of times to provide information to a user. For example, the characteristic information may be calculated for a week period, a monthly period, a yearly period, etc.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, apparatus, or article of manufacture using standard programming and/or engineering techniques to produce software, firmware, hardware, or any combination thereof to control a computer to implement the disclosed embodiments.

The foregoing description of exemplary embodiments of the invention has been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed. The embodiments were chosen and described in order to explain the principles of the invention and as practical applications of the invention to enable one skilled in the art to utilize the invention in various embodiments and with various modifications as suited to the particular use contemplated.

What is claimed is:

1. A device for identifying information characterizing use of a website, the device comprising:
   a processor; and
   a non-transitory computer-readable medium operably coupled to the processor, the non-transitory computer-readable medium comprising computer-executable instructions that when executed by the processor cause the device to perform operations comprising
   analyzing a plurality of user profiles, wherein a user profile includes information associated with an interaction by a user with a website, and wherein the information is selected from a group consisting of a search term entered at the website by the user, a data entry item entered at the website by the user, a click stream generated at the website by the user, an entry point to the website, a time since the user accessed the website, an Internet service provider used to access the website, a login name entered by the user, an exit point from the website, a number of comments posted to the website by the user, a frequency that the comments are posted to the website by the user, and a user information associated with the login name;

identifying a set of words from a plurality of user comments associated with the website;
identifying a part of speech for each word of the identified set of words;
identifying a second set of words from the plurality of user comments based on the identified part of speech, wherein the second set of words are identified as a noun;
calculating a value for each word of the identified second set of words, wherein the value is associated with a probability that the word indicates a topic of the plurality of user comments;
identifying a topic of the plurality of user comments based on the calculated value for each word of the identified second set of words;
determining characteristic information associated with use of the website based on the analyzed user profiles and the identified topic; and
presenting the determined characteristic information.

2. A non-transitory computer-readable medium comprising computer-readable instructions stored thereon that when executed by a processor, cause a computing device to:
analyze a plurality of user profiles, wherein a user profile includes information associated with an interaction by a user with a website, and wherein the information is selected from a group consisting of a search term entered at the website by the user, a data entry item entered at the website by the user, a click stream generated at the website by the user, an entry point to the website, a time since the user accessed the website, an Internet service provider used to access the website, a login name entered by the user, an exit point from the website, a number of comments posted to the website by the user, a frequency that the comments are posted to the website by the user, and a user information associated with the login name;
identify a set of words from a plurality of user comments associated with the website;
identify a part of speech for each word of the identified set of words;
identify a second set of words from the plurality of user comments based on the identified part of speech, wherein the second set of words are identified as a noun;
calculate a value for each word of the identified second set of words, wherein the value is associated with a probability that the word indicates a topic of the plurality of user comments;
identify a topic of the plurality of user comments based on the calculated value for each word of the identified second set of words;
determine characteristic information associated with use of the website based on the analyzed user profiles and the identified topic; and
present the determined characteristic information.

3. A method for identifying information characterizing use of a website, the method comprising:
analyzing a plurality of user profiles by a processor, wherein a user profile includes information associated with an interaction by a user with a website, and wherein the information is selected from a group consisting of a search term entered at the website by the user, a data entry item entered at the website by the user, a click stream generated at the website by the user, an entry point to the website, a time since the user accessed the website, an Internet service provider used to access the website, a login name entered by the user, an exit point from the website, a number of comments posted to the website by the user, a frequency that the comments are posted to the website by the user, and a user information associated with the login name;
identifying, by the processor, a set of words from a plurality of user comments associated with the website;
identifying, by the processor, a part of speech for each word of the identified set of words;
identifying, by the processor, a second set of words from the plurality of user comments based on the identified part of speech, wherein the second set of words are identified as a noun;
calculating, by the processor, a value for each word of the identified second set of words, wherein the value is associated with a probability that the word indicates a topic of the plurality of user comments;
identifying, by the processor, a topic of the plurality of user comments based on the calculated value for each word of the identified second set of words;
determining, by the processor, characteristic information associated with use of the website based on the analyzed user profiles and the identified topic; and
presenting, by the processor, the determined characteristic information.

4. The method of claim 3, wherein the identified topic is the determined characteristic information.

5. The method of claim 4, further comprising grammatically correcting the plurality of user comments before identifying the set of words.

6. The method of claim 3, further comprising:
identifying a third set of words from the plurality of user comments;
identifying a second part of speech for each word of the identified third set of words;
identifying a fourth set of words from the plurality of user comments based on the identified second part of speech; and
determining a sentiment associated with the plurality of user comments based on the identified second set of words, wherein the determined sentiment is the determined characteristic information.

7. The method of claim 6, wherein the fourth set of words are identified as an adjective or an adverb.

8. The method of claim 6, further comprising identifying a root form of each word of the identified fourth set of words before identifying the sentiment.

9. The method of claim 6, wherein determining the sentiment comprises:
comparing each word of the identified fourth set of words to known positive words and known negative words;
assigning a value to each word of the identified fourth set of words based on the comparison;
calculating a total value for each sentence of the plurality of user comments based on the value assigned to each word of the sentence; and
calculating a sentiment value based on the calculated total value for the plurality of user comments; and
determining the sentiment based on the calculated sentiment value.

10. The method of claim 9, further comprising identifying a root form of each word of the identified fourth set of words before comparing each word.

11. The method of claim 9, wherein assigning the value to each word based on the comparison comprises:
if a word of the identified fourth set of words is included in the known positive words and the known negative words, assigning the value;

if a word of the identified fourth set of words is not included in the known positive words and the known negative words, identifying a synonym of the word;

comparing the identified synonym to the known positive words and the known negative words; and if the identified synonym is included in the known positive words and the known negative words, assigning a second value to the word, wherein the second value is different from the value.

12. The method of claim 3, wherein the characteristic information is selected from a group consisting of a sentiment indicator, an engagement indicator, a topic indicator, an insight indicator, an influence indicator, a website activity level, a category indicator, and an interaction indicator.

13. The method of claim 3, wherein the user comments associated with the website are part of an electronic discussion conducted using an application selected from a group consisting of a text messaging application, an instant messaging application, a chat session application, an e-mail application, a short messaging service application, and a multimedia messaging service application.

14. The method of claim 13, wherein the electronic discussion is initiated with an agent, wherein the agent is a computer generated entity.

15. The method of claim 3, further comprising:

receiving a filter parameter; and filtering a second plurality of user profiles based on the received filter parameter to identify the plurality of user profiles before analyzing the plurality of user profiles.

16. The method of claim 3, further comprising:

receiving a filter parameter; and filtering a second plurality of user comments based on the received filter parameter to identify the plurality of user comments before identifying the set of words.

17. The method of claim 3, further comprising:

identifying a third set of words from the plurality of user comments;

identifying a second part of speech for each word of the identified third set of words;

identifying a fourth set of words from the plurality of user comments based on the identified second part of speech;

identifying a root form of each word of the identified fourth set of words; and associating an occurrence value with the identified root form of each word of the identified fourth set of words for each user comment of the plurality of user comments to form a plurality of tag clouds.

18. The method of claim 17, wherein the fourth set of words are identified as a noun or a verb.

19. The method of claim 17, wherein the plurality of tag clouds are organized by an association with the user.

20. The method of claim 17, wherein the plurality of tag clouds are organized by the identified topic.

21. The method of claim 17, further comprising:

receiving a search term; and searching the plurality of tag clouds to determine each user comment of the plurality of user comments that includes the received search term, wherein the identified user comments are the determined characteristic information.

22. The method of claim 21, further comprising ranking the identified user comments based on the associated occurrence value of the received search term, wherein the identified user comments are presented based on the ranking.

23. The method of claim 21, further comprising:

before searching the plurality of tag clouds, identifying a synonym of the received search term; and searching the plurality of tag clouds to determine each user comment of the plurality of user comments that includes the identified synonym.

\* \* \* \* \*

UNITED STATES PATENT AND TRADEMARK OFFICE
CERTIFICATE OF CORRECTION

PATENT NO. : 7,925,743 B2
APPLICATION NO. : 12/040087
DATED : April 12, 2011
INVENTOR(S) : Daniel Neely et al.

Page 1 of 1

It is certified that error appears in the above-identified patent and that said Letters Patent is hereby corrected as shown below:

Title Page
Item (73) under Assignee should read as follows:

(73) Assignee: Networked Insights, ~~LLC~~ Inc., Madison, WI (US)

Signed and Sealed this
Eleventh Day of October, 2011

David J. Kappos
*Director of the United States Patent and Trademark Office*